(12) United States Patent
Napau et al.

(10) Patent No.: US 8,967,012 B2
(45) Date of Patent: Mar. 3, 2015

(54) DOUBLE INVOLUTE PINION-FACE GEAR DRIVE SYSTEM

(75) Inventors: Ioan Napau, Troy, MI (US); Mircea Napau, Sterling Heights, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 500 days.

(21) Appl. No.: 13/211,852

(22) Filed: Aug. 17, 2011

(65) Prior Publication Data

US 2013/0042711 A1    Feb. 21, 2013

(51) Int. Cl.
*F16H 55/16* (2006.01)
*F16H 55/08* (2006.01)
*F16H 1/14* (2006.01)

(52) U.S. Cl.
CPC ............. *F16H 1/145* (2013.01); *F16H 55/082* (2013.01)
USPC ................................. 74/457; 74/459.5; 74/462

(58) Field of Classification Search
USPC .............. 74/457, 459.5, 424.5, 462, 417, 416
See application file for complete search history.

(56) References Cited

U.S. PATENT DOCUMENTS

| 729,157 | A | | 5/1903 | Green |
|---|---|---|---|---|
| 1,355,919 | A | | 10/1920 | Schurr |
| 1,372,725 | A | | 3/1921 | Sloan |
| 1,412,889 | A | | 4/1922 | O'Brien |
| 1,469,290 | A | | 10/1923 | Williams |
| RE16,371 | E | | 6/1926 | Trbojevich |
| 1,647,157 | A | * | 11/1927 | Trbojevich ................... 74/459.5 |
| 1,683,758 | A | | 9/1928 | Candee et al. |
| 2,311,006 | A | * | 2/1943 | Trbojevich ....................... 74/466 |
| 2,362,364 | A | | 11/1944 | Dusevoir |
| 2,954,704 | A | * | 10/1960 | Saari ............................... 74/466 |
| 3,184,988 | A | | 5/1965 | Osplack et al. |
| 3,220,279 | A | * | 11/1965 | Dareing .......................... 74/462 |
| 3,552,226 | A | | 1/1971 | Roth |
| 3,768,326 | A | * | 10/1973 | Georgiev et al. ................ 74/425 |
| 3,915,060 | A | | 10/1975 | Koga |
| 4,211,511 | A | | 7/1980 | Kotthaus |
| 4,224,834 | A | * | 9/1980 | Kotthaus ......................... 74/462 |
| 4,238,970 | A | * | 12/1980 | Carter .............................. 74/457 |
| 4,367,058 | A | | 1/1983 | Carter |
| 4,651,587 | A | * | 3/1987 | Anderson et al. ............ 74/459.5 |
| 7,426,777 | B2 | * | 9/2008 | Nagata et al. ................. 29/33 R |
| 2010/0132493 | A1 | * | 6/2010 | Tan ................................. 74/417 |
| 2010/0132496 | A1 | * | 6/2010 | Okamoto ......................... 74/457 |

FOREIGN PATENT DOCUMENTS

RO          107302          10/1993

* cited by examiner

*Primary Examiner* — David M Fenstermacher
*Assistant Examiner* — Emily Cheng

(57) ABSTRACT

A double involute pinion-face gear drive provides transmission of torque and speed, or direction of movement modification between non-intersecting shafts at right angles to one another. A double involute cylindrical pinion on one axis, engages a rotatable disk-shaped gear on the second axis. The teeth of the pinion are curved in an abridged, normal or extended involute shape. Likewise, the teeth of the face gear are curved in abridged, normal or extended involute shape in the lengthwise direction of the teeth. These gear drives can be simultaneously bi-rotational and bi-directional and allow a relatively wide range of speed ratios, as low as 1:1 and as high as 7.5:1.

20 Claims, 23 Drawing Sheets

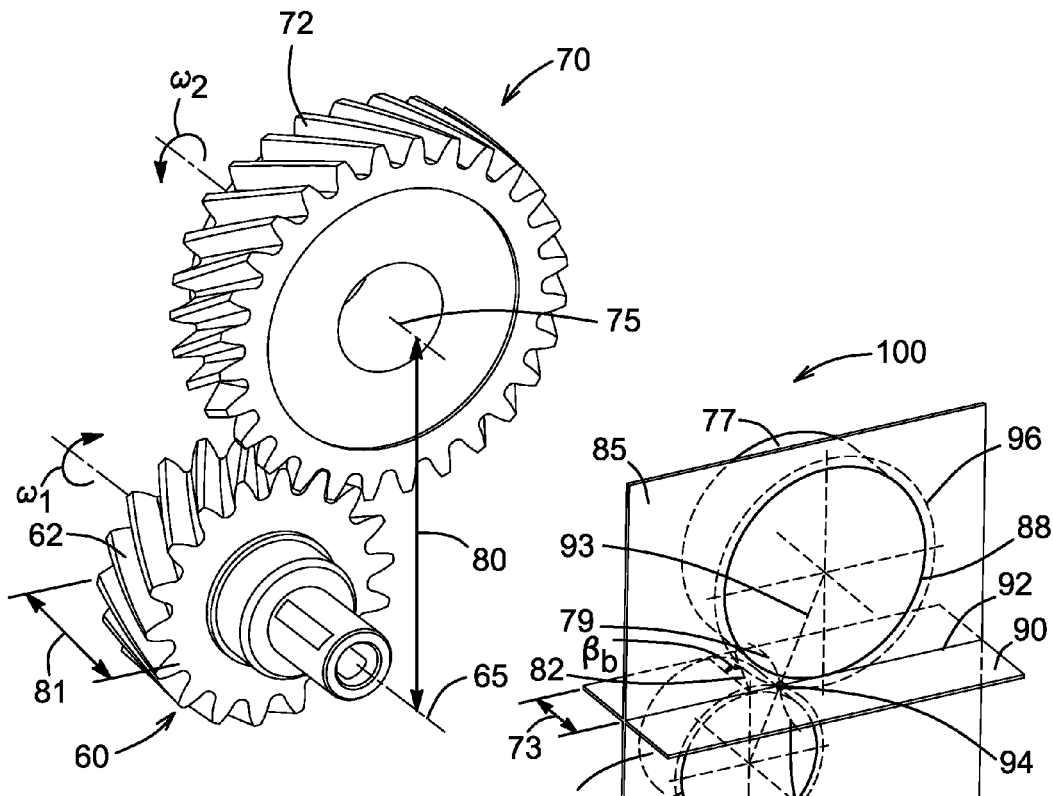
FIG. 2A
PRIOR ART
FIG. 2B
PRIOR ART
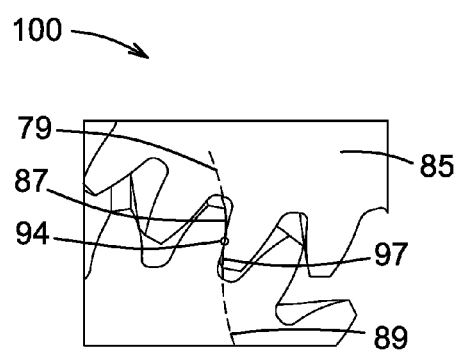
FIG. 2C
PRIOR ART
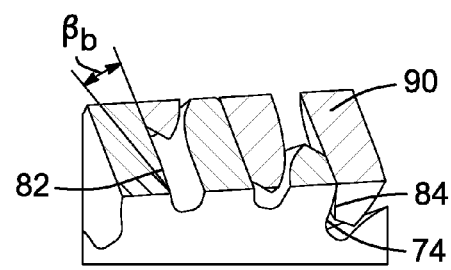
FIG. 2D
PRIOR ART

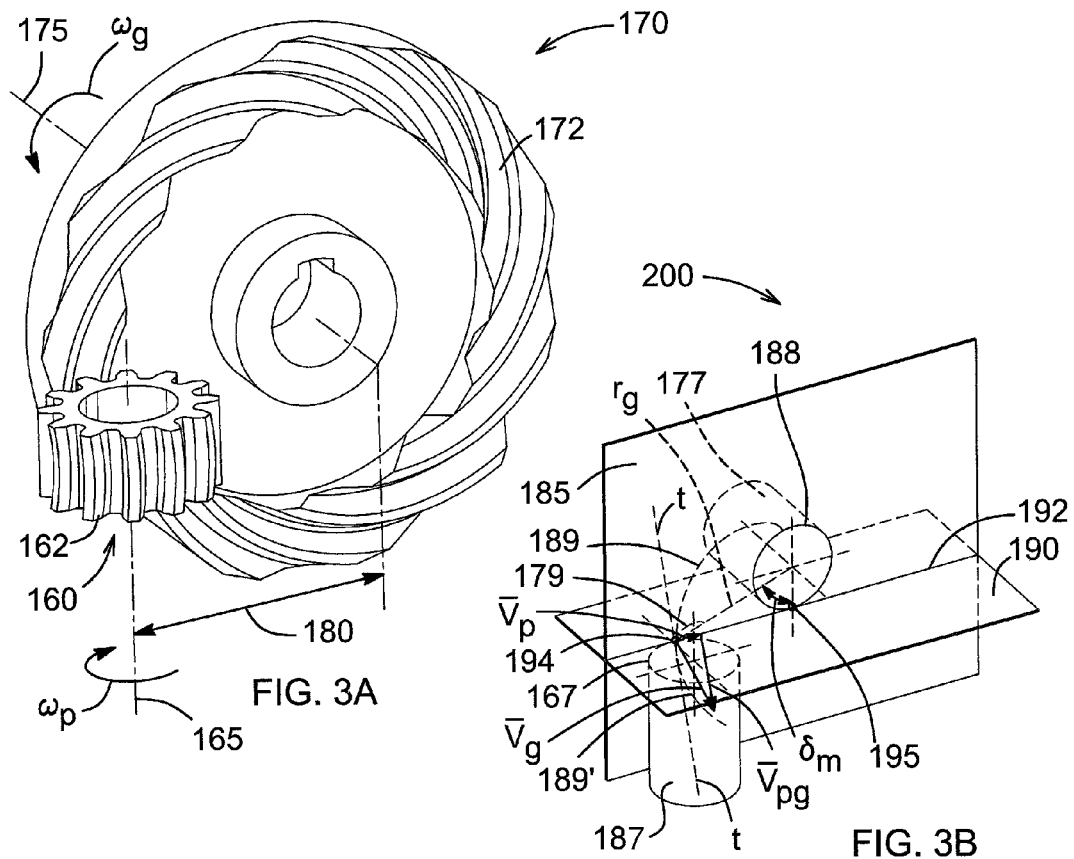
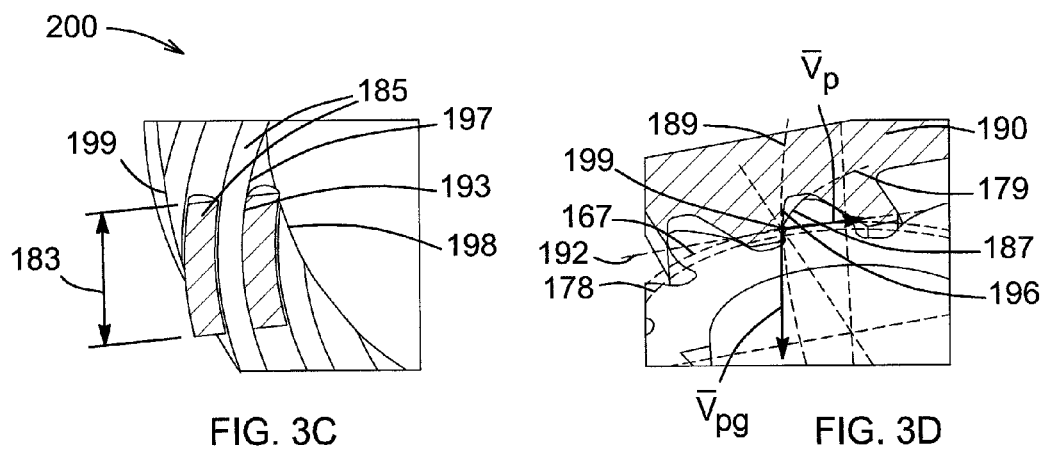

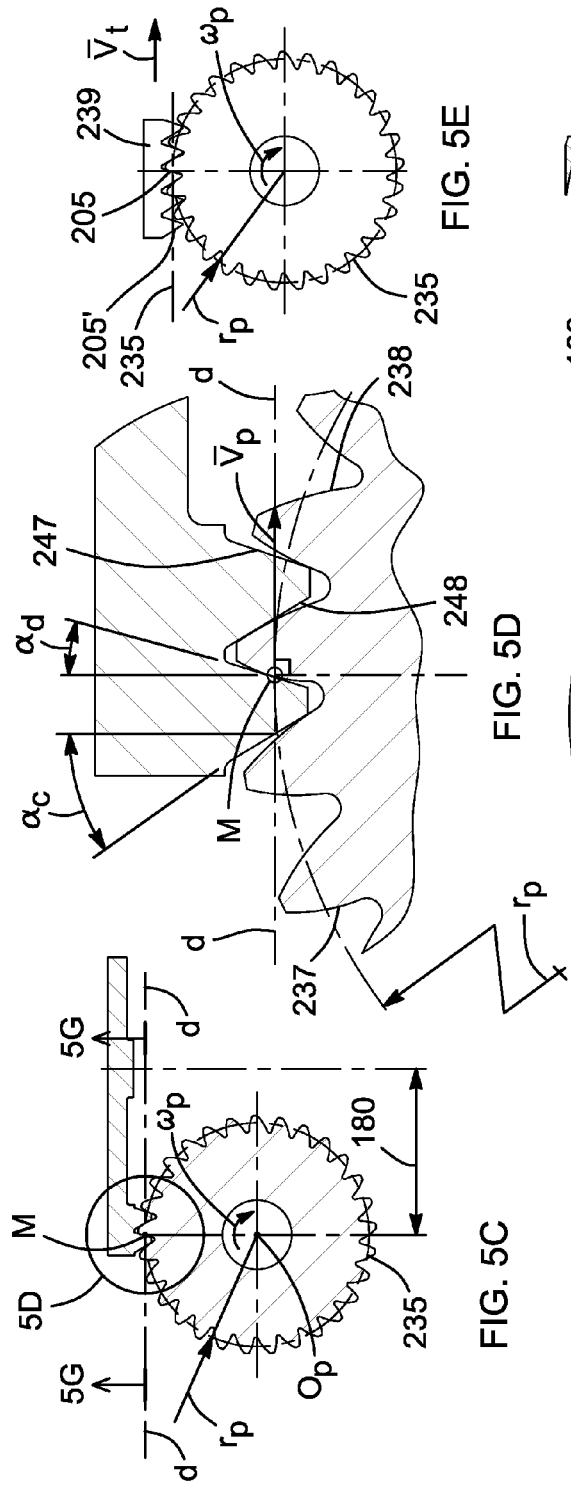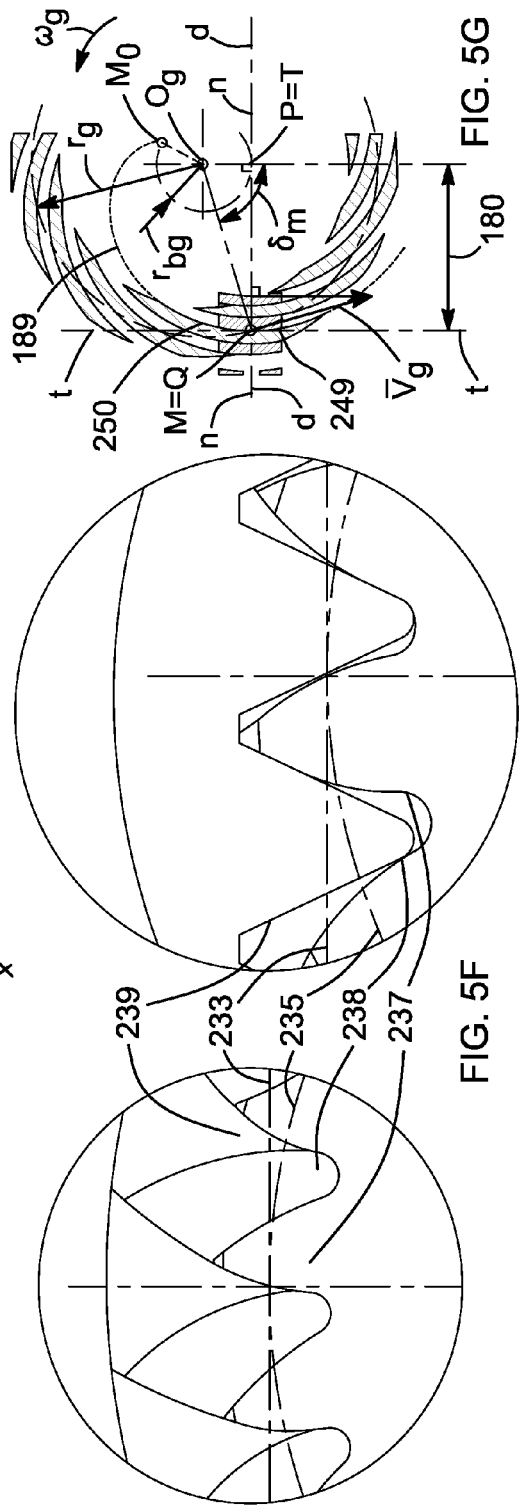

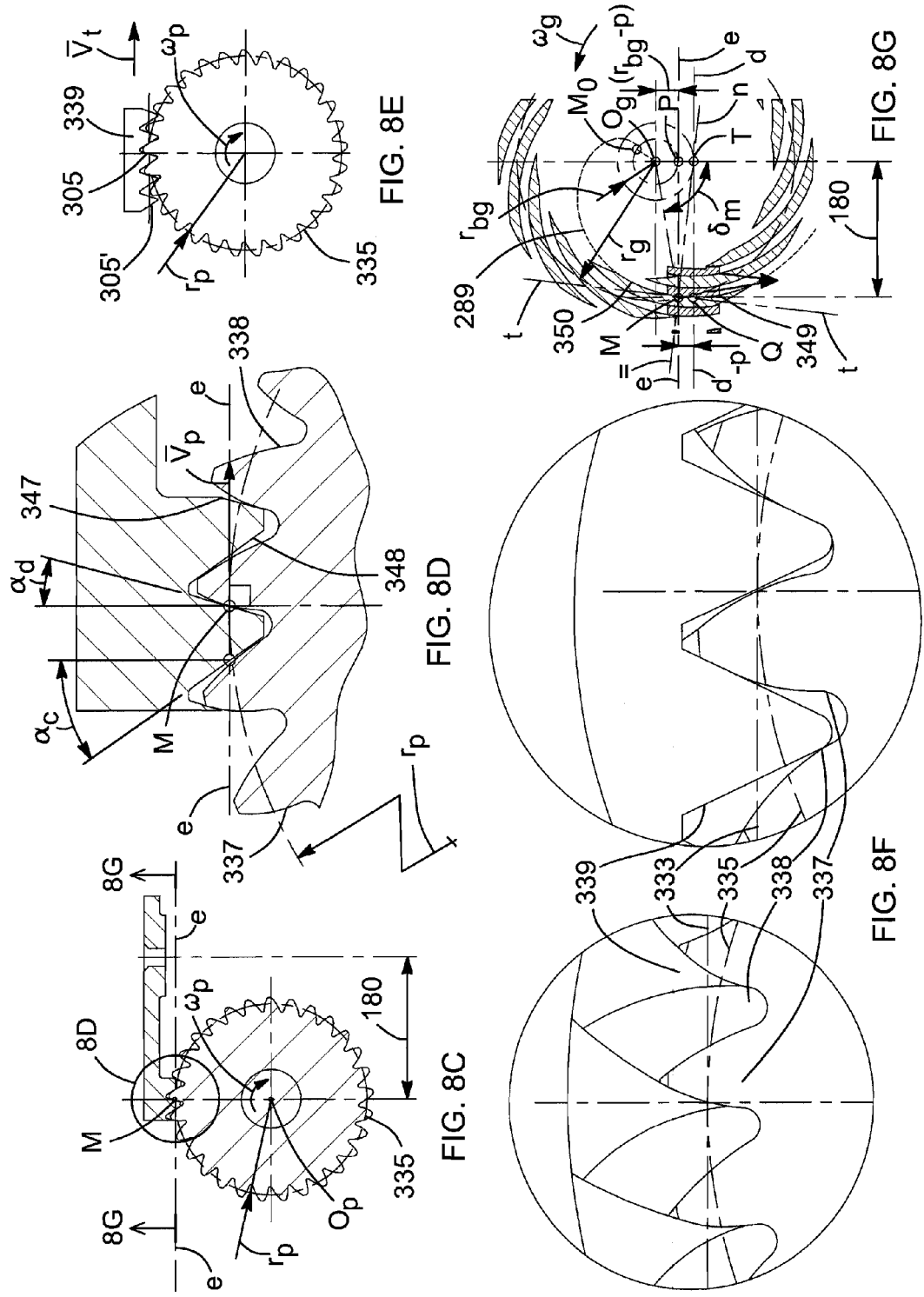

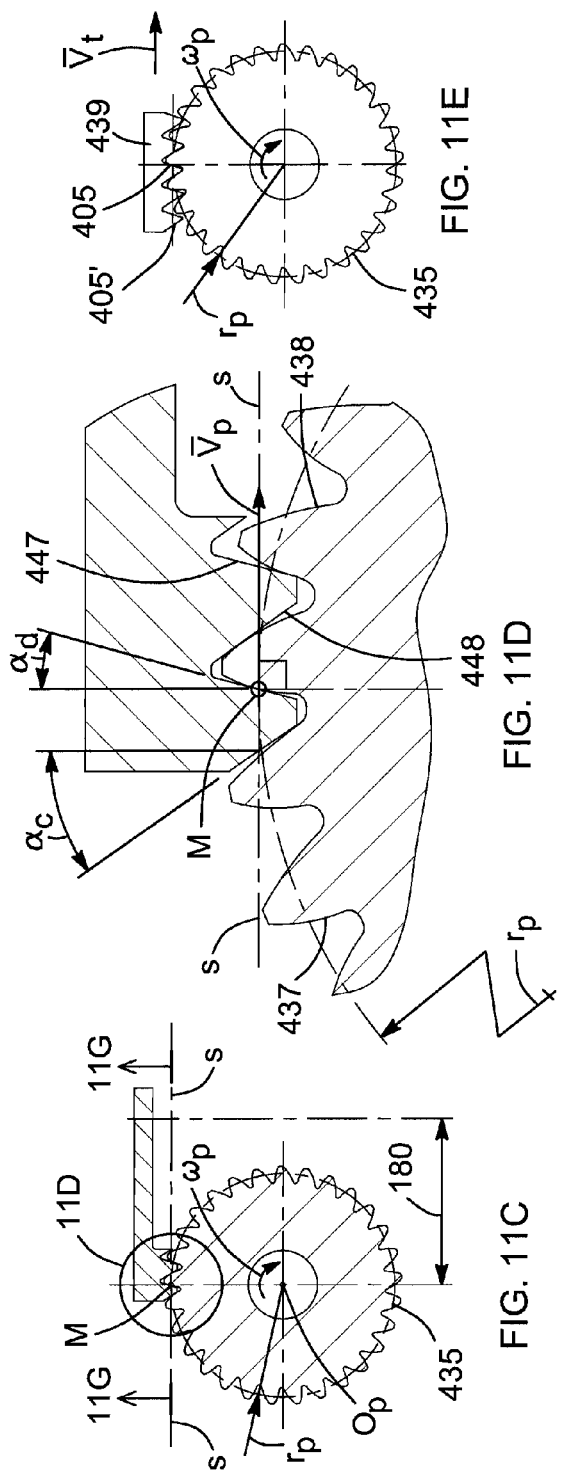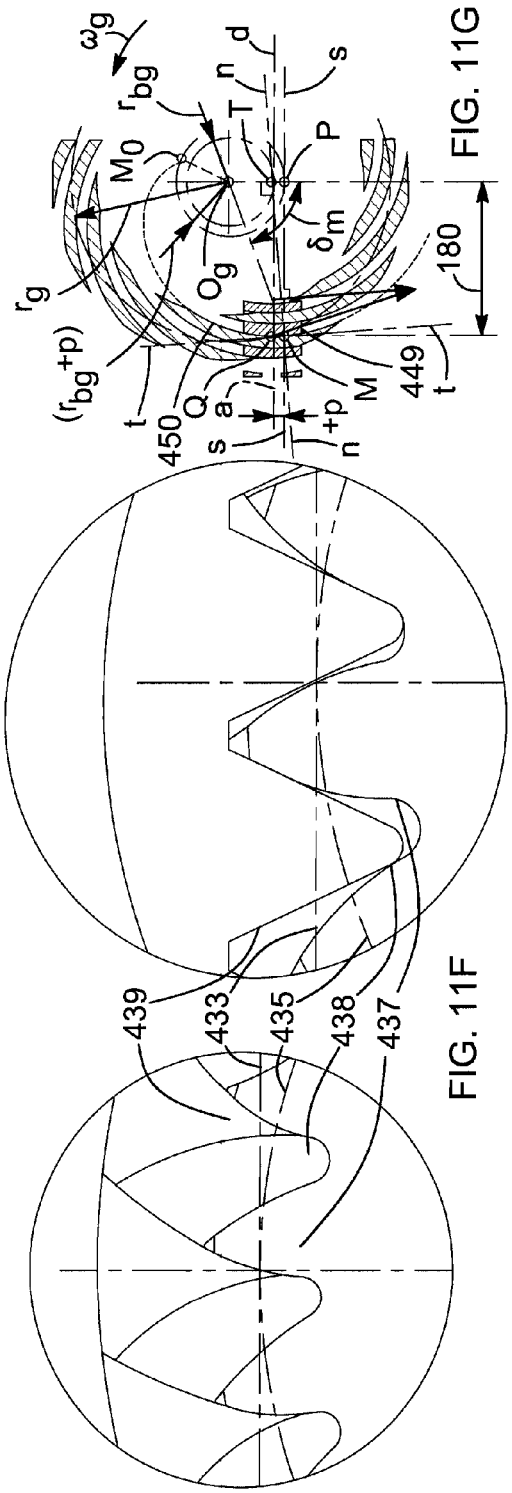

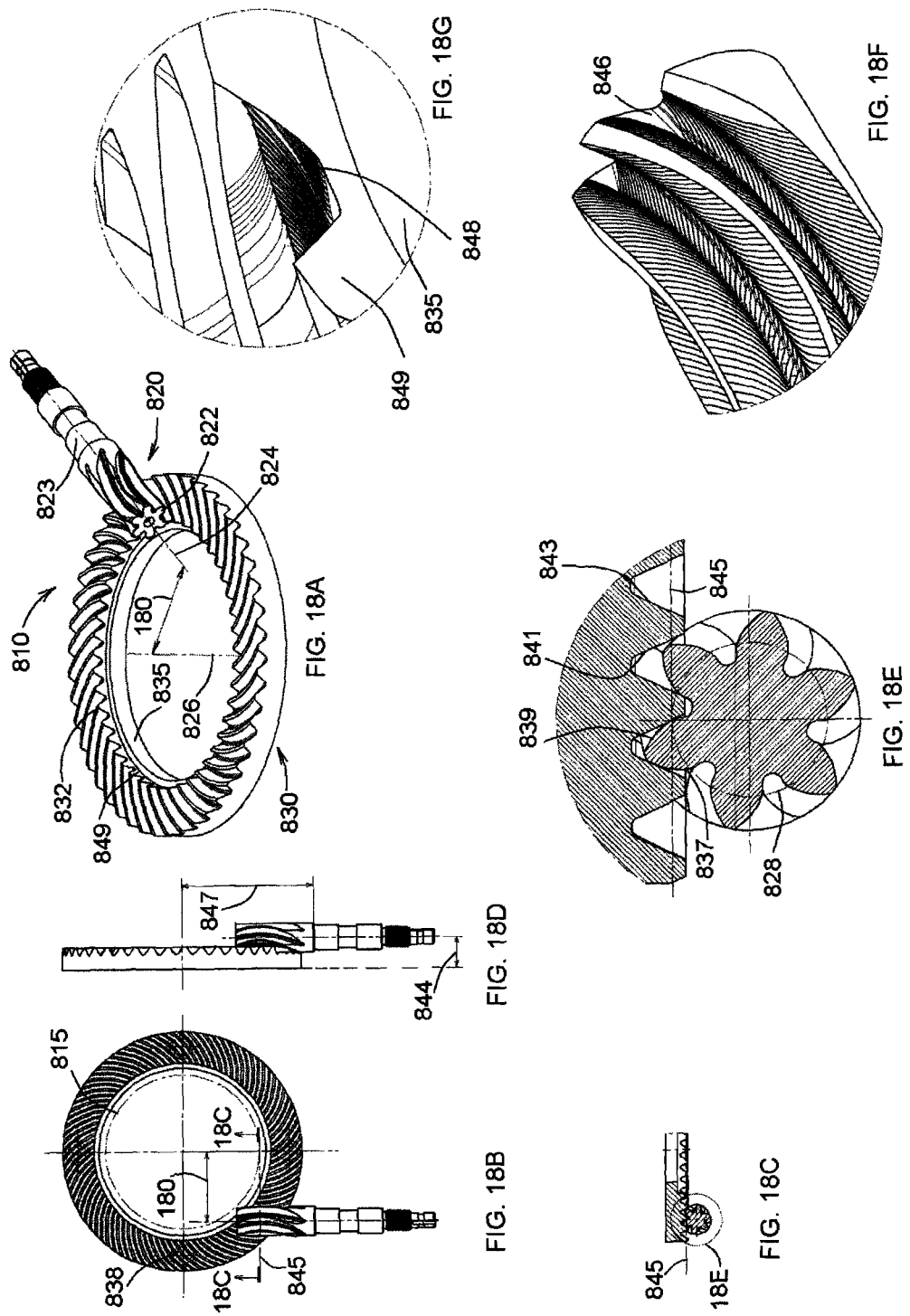

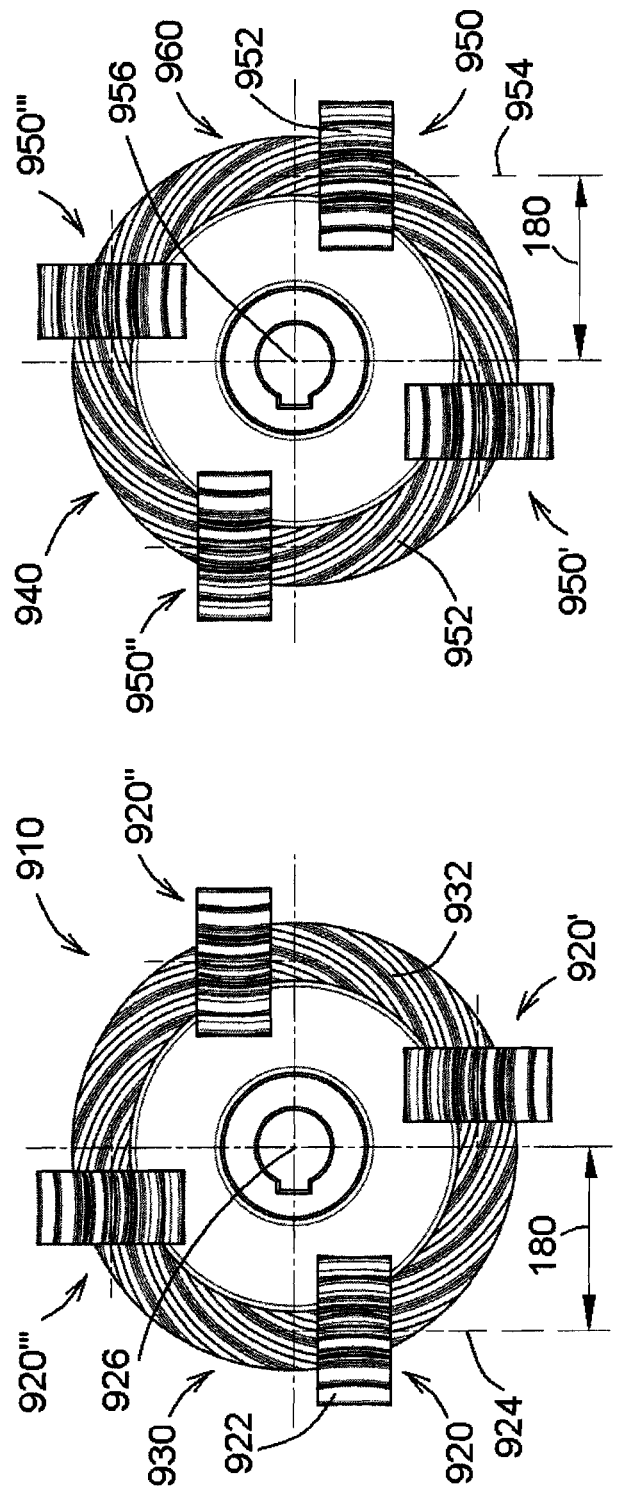

DOUBLE INVOLUTE PINION-FACE GEAR DRIVE SYSTEM

FIELD

The present disclosure relates generally to skew-axis gearing in which one of mating gears is a face gear, and more particularly to double involute pinion-face gear drive and double involute pinion-face gear drive systems.

BACKGROUND

The statements in this section merely provide background information related to the present disclosure and may or may not constitute prior art.

Conventionally, cylindrical spur and helical gear pairs are routinely utilized to transfer torque and speed between parallel shafts. Bevel gear pairs are routinely utilized to transmit torque between a pair of shafts having intersecting axes that are disposed at an angle to one another, commonly at a right angle. Likewise, so called "on-center" face gear pairs can be use to transfer torque between intersecting shafts. Such a gear arrangement consists of a spur cylindrical pinion and a face gear mounted like bevel gears on shafts that intersect orthogonally to each other. When the cylindrical pinion teeth mesh with face gear teeth they act as bevel gears, their pitch surfaces being cones of rotation. Apart from the fact that they are less sensitive at mounting distance than bevel gears are, their main advantage is that the pinion bearings carry mostly radial load, while the gear bearings have both radial and thrust load. Due to operating pressure increases towards the outside diameter variation, while the depth of the tooth remains constant, the maximum usable outside diameter is the diameter at which the teeth become pointed. At the inside end, the limit is the radius at which the undercut becomes excessive.

It is generally a more difficult challenge to transmit torque between skew-axes shafts, that are neither parallel nor intersecting, and more particularly to non-intersecting shafts disposed "offset" at right angles. A significant difficulty is to transmit the torque and speed between non-intersecting orthogonal axes in both directions of rotation of the driving member, and moreover, to be able to interchange the two components status from drive to driven and vice-versa, within the same gear drive system. While most of skew-axis drives are "bi-rotational" not many can be "bi-directional" at the same time. As utilized herein, the term "bi-rotational" means that the gear assembly can transmit torque in either direction of rotation of the driving member, while the term "bi-directional" refers to whether a specific gear, e.g., the pinion gear, can operate as either the input or drive gear or the output or driven gear as well. Sometimes, within gear dedicated technical literature, the ability of a gear drive system to be "non-bidirectional" is called "self-locking" or "anti-backdrive."

The most common prior art approach to the problem of torque transfer between non-intersecting orthogonal shafts involves the use of hypoid gears, especially in typical automobile differentials. They resemble bevel gears in some respects, but differ from true bevel gears in that their axes do not intersect. The distance between a hypoid pinion (in all practical cases, the driving member) axis and the axis of a hypoid gear (in all practical cases, the driven member) is called "offset". Hypoid pinions may have as few as five teeth, compared with bevel gears that do not often have fewer than ten teeth, a fact that suggests their ability to realize high reduction gear ratios, and that they are seldom used as gear ratio multipliers. Hypoid gears are especially suited for transmitting large amounts of torque through angles with good efficiency and improved contact load capacity as disclosed by U.S. Pat. No. 2,961,888. Their use has also drawbacks. Hypoid gears are extremely sensitive to their components' relative location, being also adversely affected by small amounts of thermal growth during operation, as well as by defections of the gear supporting structure under load. Such sensitivity requires also complex manufacturing, assembly, and gear mating procedures, limiting the speed reduction ratios for which they can be advantageously employed to low gear speed reduction ratios (ratios less than 4:1).

Hereinafter, the term "pinion" will be used for a gear drive system component, having the teeth disposed radially on a cylindrical or conical surface that has the axis of rotation identical with axis of rotation of the corresponding component. Usually, it is the smaller component in mesh and can be a cylindrical gear with helical teeth, a cylindrical gear with curved teeth along its axis, or a cylindrical or conical worm. The term "gear", "face gear" or "crown gear" is usually used for the larger component in mesh having the axis of rotation disposed offset at a right angle relative to the pinion axis, and the teeth formed on one of its side faces. The teeth can be disposed non-radially, having straight flanks or curved along a spiral curve, thus being provided with a convex and a concave flank. The tooth top land can lie in a plane, and the gear hence may be called a "flat gear" or on the surface of a cone. Likewise, the bottom land of gear tooth can lie also in a plane or on a surface of a cone.

A common prior art approach to the problem of torque transfer between non-intersecting orthogonal shafts involves the use of offset face gears, as partially disclosed by U.S. Pat. No. 5,178,028. The teeth of a cylindrical pinion disposed offset at a right angle relative to the face gear axis are helical, while the face gear teeth having straight edges are formed on one of its end faces and inclined from radial direction. The top and bottom land lie in two parallel planes. Although this type of gear system exhibits less sensitivity to the axial position of the pinion on the face gear, as well as more tolerance for movement toward or away from its driven face gear compared to an equivalent hypoid gear pair, due to the offset, the profile variations of face gear teeth are more pronounced. Like on-center face gears, the offset face gears have their outside and inside diameters limited by teeth pointing and undercutting phenomena. They can easily accommodate speed reduction ratios greater than 4:1. In another embodiment, as disclosed by U.S. Pat. No. 2,311,006, a spiral crown gear having a plurality of longitudinally curved teeth of ever increasing radii of curvature and a variable cross section throughout their length meshes with a cylindrical pinion having a plurality of helical teeth of a constant cross section throughout their length, though its pitch surface is a hyperboloid. Due to teeth asymmetry of both components, the novel gear drive allows for interference avoidance and for a prolonged contact. There is no mention of their bi-directional capability.

Another common prior art approach to the problem of torque transfer between non-intersecting orthogonal shafts involves the use of skew-axis gearings of so-called "worm-face gears drives" type. Characteristic of this type of gears is their high gear ratio in a compact arrangement and their good load-carrying capacity. Often they are recognized by their trademark names, the most known being Spiroid®, Helicon®, and Spiradrive® gear systems. Specific for all gear drives where the axes are either parallel or intersecting, the pitch diameters of the mating gears must be exactly proportional to their respective number of teeth and inversely proportional to the relative velocities. In this case of offset gear drives the respective pitch diameters are independent of the gear ratio. Where one of the members is a worm, as disclosed in U.S. Pat. No. 1,683,758, its pitch diameter may be changed at will by altering its thread angle. Such gears thus have the advantage that the driving member or the worm may be made proportionately larger compared to bevel gears with intersecting axes having the same gear ratio. Here the crown gear having longitudinally curved teeth of constant height mates with a cylindrical worm, the worm threads and the gear teeth being of opposite hand.

U.S. Pat. No. Re. 16,137 discloses a conventional gear system in which a conical worm or a beveled pinion meshes with a spiral beveled gear. The beveled gear teeth are shaped in the form of modified involutes of a circle. Specific for both mentioned gear systems, is the fact that the worm is the primary member. U.S. Pat. No. 2,896,467 discloses another conventional gear system capable of an unusually large offset, great area of contact and low reduction ratios. In this case, the gear is considered the primary member, rather than the worm. While the worm threads are curved, the face gear teeth are straight and non-radially disposed on one end face of the gear, with the top land in a plane and the bottom lands on a conical surface. A significant difficulty of all these combinations, although it can sometimes be a benefit, is that torque transfer can occur only from the worm to the beveled gear— the worm gear cannot be back driven. Thus, such a gear assembly, although bi-rotational, is not bi-directional.

Gear configurations for non-intersecting orthogonal shafts that are both bi-rotational and bi-directional do exist. Prior art is disclosed by U.S. Pat. No. 4,238,970 where a bevolute gear system is designed to be completely non-self-locking. The gear system includes a non-beveled pinion having the teeth shaped in the form of an involute spiral, and meshes with spiral involute curved teeth of a face gear, positioned at approximately 90° relative to each other at an offset in the range of 50% to 75% of the pitch circle radius of the face gear. The pinion includes teeth which are shaped in the form of a normal involute spiral. The bevolute gear system includes a second gear which also includes teeth which are shaped in the form of a normal involute spiral and flat and in one plane, mounted on a non-intersecting axis at a right angle to the axis of the pinion gear. However, these configurations are typically limited as gears speed ratio span, means to avoid their teeth interference in mesh and undercutting in the manufacturing process, means to improve the gears load capacity and efficiency while reducing their weight, contact stress and noise in operation.

SUMMARY

It is desirable and often necessary to provide gear configurations for non-intersecting orthogonal shafts which are bi-rotational, can operate bi-directionally and also provide a relatively wide range of low gear speed ratios, including gear speed ratios as low as 1:1 and as high as 7.5:1. Also, it is desirable to provide gears configurations for non-intersecting orthogonal shafts which are bi-rotational, can operate bi-directionally and also avoid the interference in mesh and undercutting. By taking advantage of using combinations of modified and normal involute curves of a circle not only as the gears teeth profile shapes but also as their lengthwise shapes, the teeth curvature can be modified while imposing no restrictions on pinion centerline position relative to the face gear base circle. It is also desirable to provide gears configurations for non-intersecting orthogonal shafts which are bi-rotational, can operate bi-directionally and have the teeth with a certain grade of asymmetry that can improve their load capacity and efficiency, while reducing their weight, contact stress and noise in operation. It is also desirable to provide gears configurations for non-intersecting orthogonal shafts which are bi-rotational, can operate bi-directionally and have the pinion and face gear teeth made from metal by cutting, plastic materials by injection molding and powder metal sintered material by sintering process. Last but not the least, it is desirable to provide gears configurations for non-intersecting orthogonal shafts which are bi-rotational, can operate bi-directionally and have the teeth surface hard finished for an improved mesh quality, while extending their teeth manufacturing capabilities in order to reduce the manufacturing cost. The present invention is so directed.

The present invention provides a double involute pinion-face gear drive system that is bi-directional, bi-rotational and provides a relatively wide range of speed ratios, including gear speed ratios as low as 1:1 and as high as 7.5:1. The double involute pinion-face gear drive system provides torque and speed transmission between non-intersecting shafts at right angles to one another. Specifically, the invention is an orthogonal skew axis gearing system having a cylindrical pinion with teeth curved in their lengthwise direction parallel to the pinion axis, in mesh with a face gear that has also teeth curved in the lengthwise direction. The teeth of the cylindrical pinion, as well as the teeth of the face gear, can be curved in a shortened, normal or extended involute curve shape in their longitudinal direction, within the face gear pitch plane, which is perpendicular to the face gear axis and tangent to the pinion pitch cylinder. The face gear pitch circle lies on its pitch plane, contains its pitch point and usually its radius is considered to be located closed to the middle of the face gear width. Within this plane, often designated as the teeth longitudinal profile shape generating plane, the nature of the pinion and face gear teeth longitudinal shapes, as normal, extended or shortened involute curves can be visualized. Moreover, within this plane the mesh between pinion teeth and face gear teeth can be imagined as the mesh between two conjugate curved-racks with a curvilinear contact. The teeth of the pinion as well as the teeth of the face gear can be imagined as generated by rolling the pinion and the face gear blanks on their correspondingly curved rack-cutters. The plane perpendicular to the face gear pitch plane and tangent to the face gear base cylinder is designated as the gear drive plane of action. Considering now the line of intersection between the face gear pitch plane and the gear drive plane of action as an inextensible string rigidly attached to pinion pitch cylinder, when the pinion and the face gear will rotate with constant angular velocities around their axes, this string is unwrapping from pinion pitch cylinder periphery while wrapping onto the face gear base cylinder periphery with the same tangential speed. In other words, the rotation of the pinion around its axis will cause the face gear to rotate about its axis, thus a true angular velocity being transmitted between the pinion and the face gear. Similarly, the rotation of the face gear around its axis will cause the pinion to rotate about its axis, thus a true angular velocity being transmitted between the face gear and the pinion. The plane parallel to the plane of action rigidly connected to it and containing the pinion pitch point is designated as the pinion pitch plane. Obviously, the pitch plane for a double pinion-face gear drive having the gears teeth longitudinally shaped as normal involute curves of the face gear base circle of radius $r_{bg}$ is overlapping the plane of action. For a double pinion-face gear drive having the gears teeth longitudinally shaped as shortened and extended involute curves of the same face gear base circle, the pinion pitch planes are parallel to the gear drive plane of action and tangent to concentric cylinders of radii $(r_{bg}+p)$ and $(r_{bg}-p)$, respectively, located outwardly and inwardly relative to the same face gear base cylinder, at certain distances equal to the magnitude of involute modification desired. Within the pinion pitch planes, often designated as gears teeth depth profile generating planes, a true conjugate action between a spur cylindrical pinion of infinitesimal width having a normal involute depth profile and a straight-line shaped rack of the same pressure angle and infinitesimal width belonging to the face gear teeth can be considered and observed. On either side of the gears plane of action a sliding action occurs along the tooth surfaces. This deviation is accounted for in the generating process, by choosing the right magnitude of the involute modification p, and by limiting the pinion width accordingly, in order to avoid the interference in mesh and undercutting in the manufacturing process. Because of involute spiral teeth shape profiles, a quiet and smooth gear action is produced.

As utilized herein, the term "double involute pinion" refers to a cylindrical pinion including a plurality of teeth which have involute shape profile in two specific perpendicular planes: the pinion teeth depth profile shape is a normal involute curve of the pinion base circle within its pitch plane, while the pinion teeth shape curve in their lengthwise direction, can be either a normal, extended or shortened involute curve of the mating face gear base circle within the face gear pitch plane.

As utilized herein, the term "double involute pinion-face gear drive" refers to an orthogonal skew-axis gearing for transmitting torque between non-intersecting axes disposed orthogonally offset at a predetermined centre distance, comprising a cylindrical pinion mounted on one of the said axes, in meshing engagement with a face gear mounted on the second said axis. The pinion has a cylindrical form including a plurality of radial teeth on its periphery with convex flanks, which are shaped in the form of a normal involute curve of the pinion base circle on their depth profile and, which are shaped also in their lengthwise direction in form of either: normal, extended or shortened involute curve of the mating face gear base circle. The face gear is a flat wheel with the teeth formed on one of its side faces, and is usually the larger component in the mesh. It should be mentioned that often the pinion may have more teeth than the mating face gear. The face gear teeth are disposed non-radially, having curved flanks along a spiral curve, in their lengthwise direction, being provided with convex and concave flanks. Like the pinion teeth longitudinal shape, the face gear teeth longitudinal shape can be a normal, extended or a shortened involute curve of the face gear base circle. The face gear teeth top and bottom lands lie in two parallel planes that are limiting the teeth constant height. The face gear depth profile shape is a straight-line but only within teeth depth profile generating planes.

As utilized herein, the term "double involute pinion-face gear drive system" refers to the entire class of possible different combinations of double involute pinion-face gear drives by choosing: a certain type of longitudinal involute curve for the pinion and face gear teeth longitudinal shape, a particular left or right-hand face gear teeth helix direction, a certain member as the drive or driven input member or a certain grade of asymmetry for gears teeth.

By way of example only, the possibility of designing a double involute pinion-face gear drive that uses an extended involute curve of the face gear base circle for the pinion and face gear teeth longitudinal shape can be mentioned. The main advantage of such a gear drive is the possibility of face gear teeth manufacturing by a hobbing process, on a 6-axis CNC machine-tool. This type of face gear with its teeth longitudinally shaped as an extended involute curve can have in addition the teeth hard finished by grinding. Another example of double pinion-face gear drives uses for the pinion and face gear teeth longitudinal shape a normal involute of the face gear base circle. Thus, U.S. Pat. No. 4,238,970 might be considered as a particular case within this double pinion-face gear drive system. However, the teeth of the pinion and face gear according to the present invention may have a certain grade of asymmetry that can improve their load capacity and efficiency while reducing their weight, contact stress and noise in operation. Moreover, the face gear according to the present invention can have its teeth manufactured by different methods than those claimed by U.S. Pat. No. 4,367,058. Another example of double pinion-face gear drive uses for the pinion and face gear teeth longitudinal shape a shortened involute of the face gear base circle. This type allows for teeth curvature modification in order to avoid the interference in mesh as well as to avoid the undercutting in the manufacturing process. All these examples of double pinion-face gear drives can be made bi-directional and can be of left-hand or right-hand type, dependent of the specific design requirements.

The involute face gear drive system of the present invention can be broadly and generally utilized in the automotive industry, military applications, machine tool construction, the medical and appliance industries, aeronautical and aerospace industries, and engineering applications where there is a need for a compact gear arrangement, reduced operating noise, reduced forces and backlash, reversible (bi-directional) torque transfer and a relative large gear ratio span, including gear speed ratios as low as 1:1 (unity).

Thus, it is an aspect of the present invention to provide a double involute pinion-face gear drive system, which comprises three types of double pinion-face gear drives. Within each type, variants can be designed by a proper choice of their characteristics: teeth symmetry or asymmetry, direction of involute generation, etc.

It is a further aspect of the present invention to provide a double involute pinion-face gear drive system that is both bi-directional and bi-rotational.

It is a still further aspect of the present invention to provide a double involute pinion-face gear drive system which provides the transmission of torque and speeds, or only the change of direction of movement, between non-intersecting shafts at right angles to one another.

It is a still further aspect of the present invention to provide a double involute pinion-face gear drive system having the teeth of both components of symmetrical or asymmetrical nature in order to improve their load capacity and efficiency, while reducing their contact stress and weight.

It is a still further aspect of the present invention to provide a double involute pinion-face gear drive system that is both bi-directional and bi-rotational and which for the same predetermined offset center distance magnitude allows for multiple gear ratios, using the same face gear component to engage different pinions of the same module, but different number of teeth. Often this characteristic is known as skew-axis gearings interchangeability, being common for gearings in which one of the two components has the teeth disposed on one of the two side ends, like Spiroid®, Helicon®, worm-face gear drives, etc.

It is a still further aspect of the present invention to provide a double involute face gear drive system which is compact, and has the face gear teeth medium helix angle within the range of 30° to 45°.

It is a still further aspect of the present invention to provide a double involute face gear drive system which is compact, reduces operating noise, reduces axial forces and backlash and provides a relatively large gear ratio span, especially in the lower gear ratios range: as low as 1:1 and as high as 7.5:1.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2A is a perspective view of a conventional helical gear used to define the genesis approach of a double involute pinion-face gear drive in particular, and of a double involute pinion-face gear drive system in general, according to the present invention;

FIG. 2B is a simplified sectional perspective of the conventional helical gear drive illustrated in FIG. 2A, through two perpendicular planes to each other: a first transverse plane, perpendicular to the gear axes and a second plane designated as the plane of action of the conventional helical gear;

FIG. 2C is a sectional perspective of the conventional helical gear drive illustrated in FIG. 2A, through the transverse plane defined in FIG. 2B;

FIG. 2D is a sectional perspective of the conventional helical gear drive illustrated in FIG. 2A, through the plane of action defined in FIG. 2B;

Figure 4:
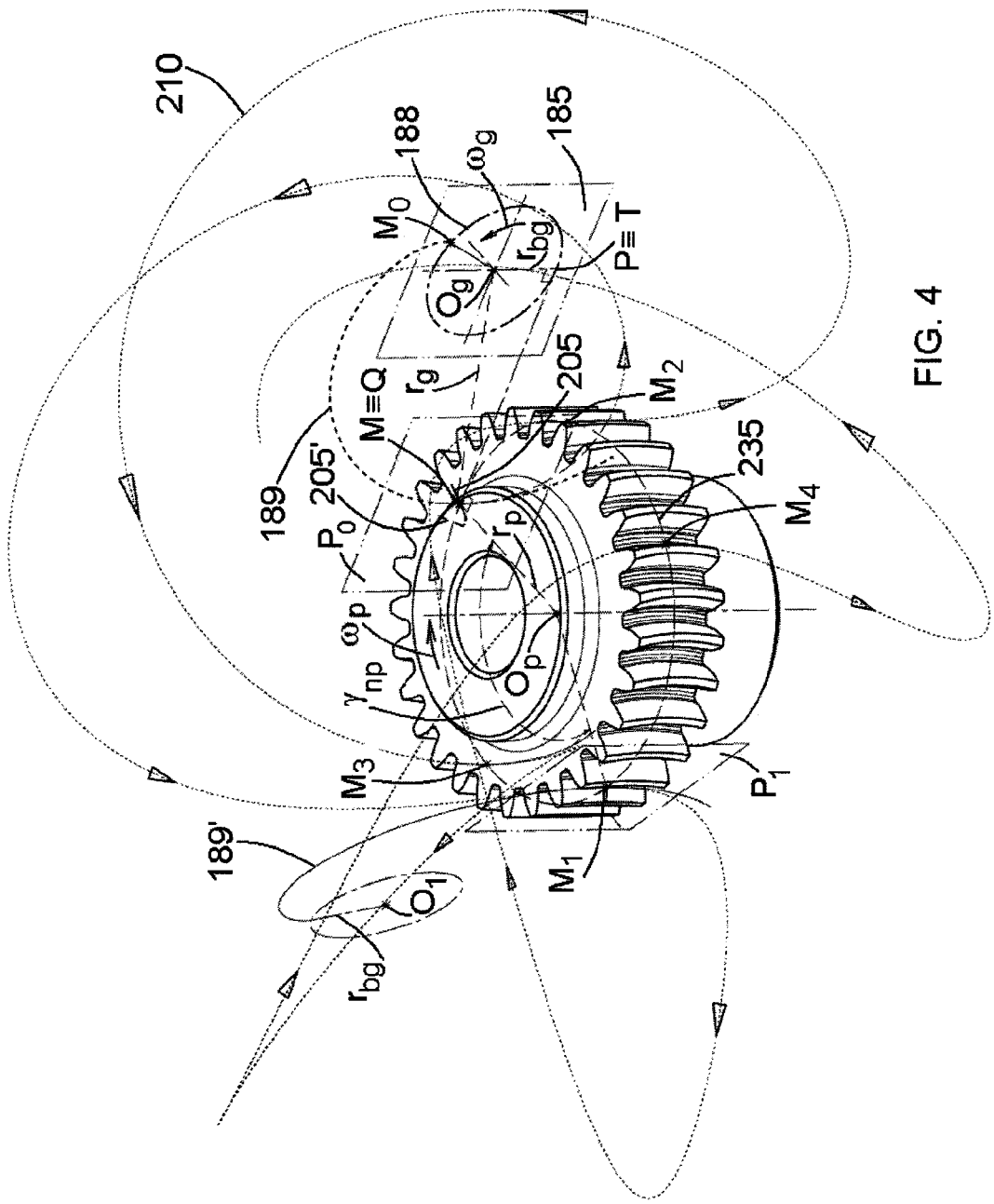
Figure 5A:
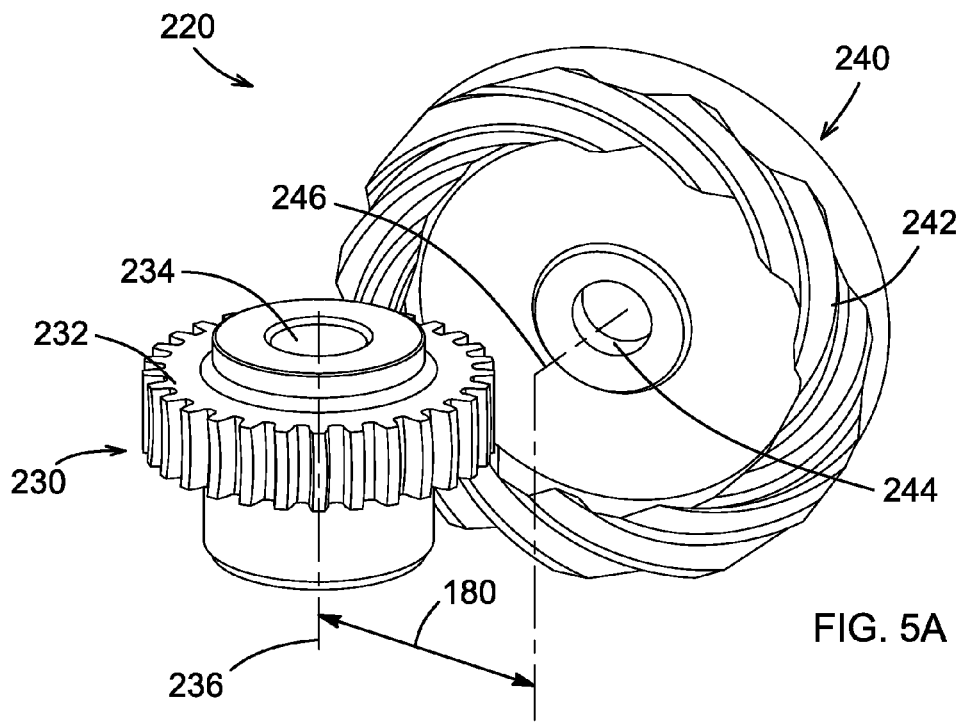
Figure 5B:
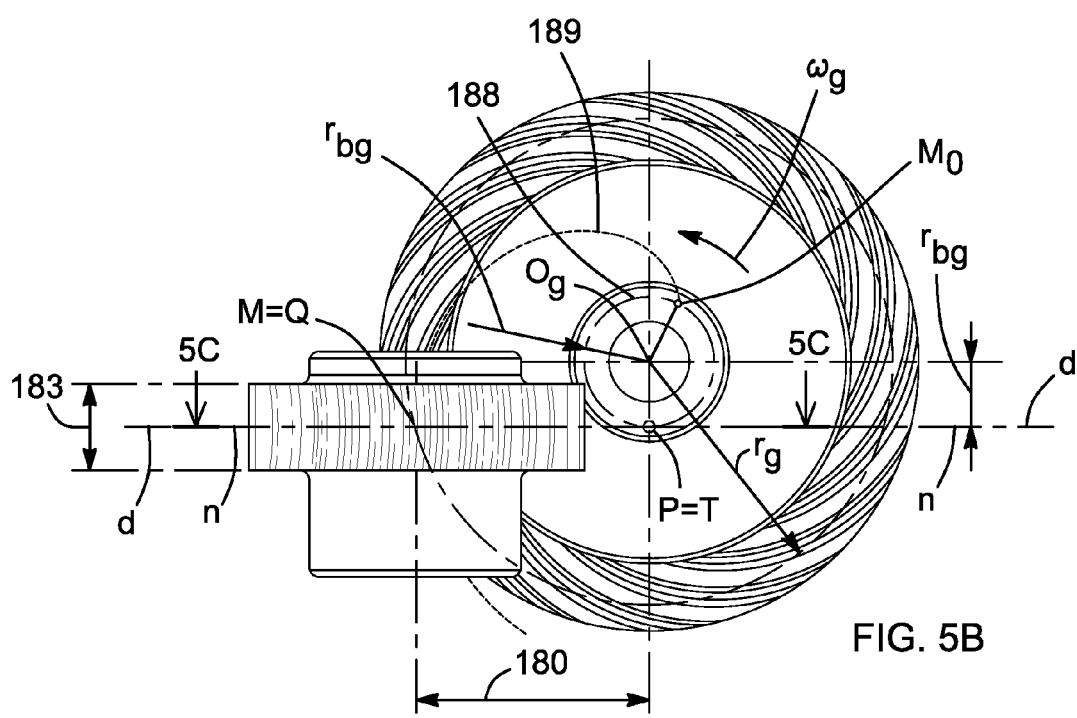
Figure 6:
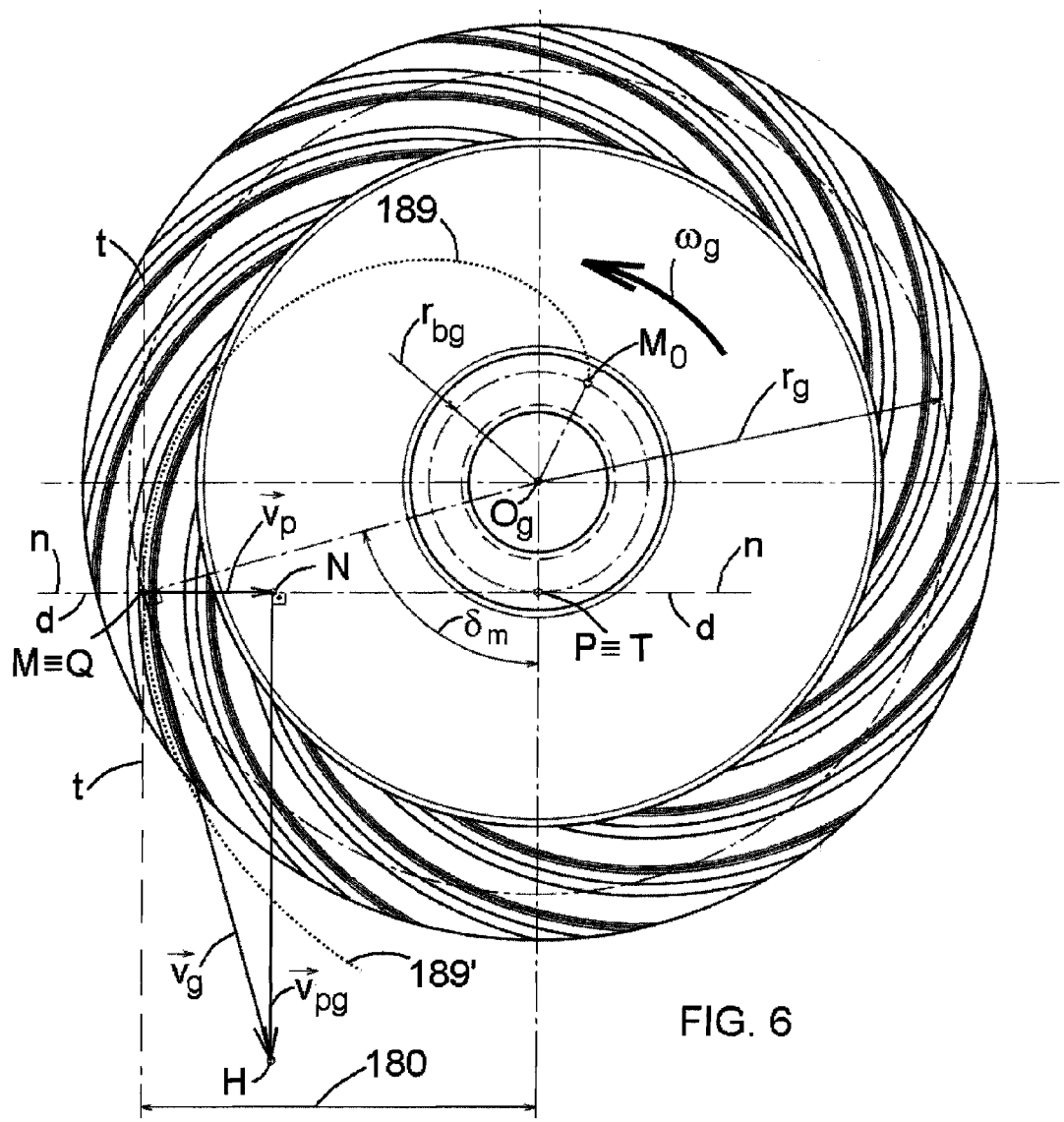
Figure 7:
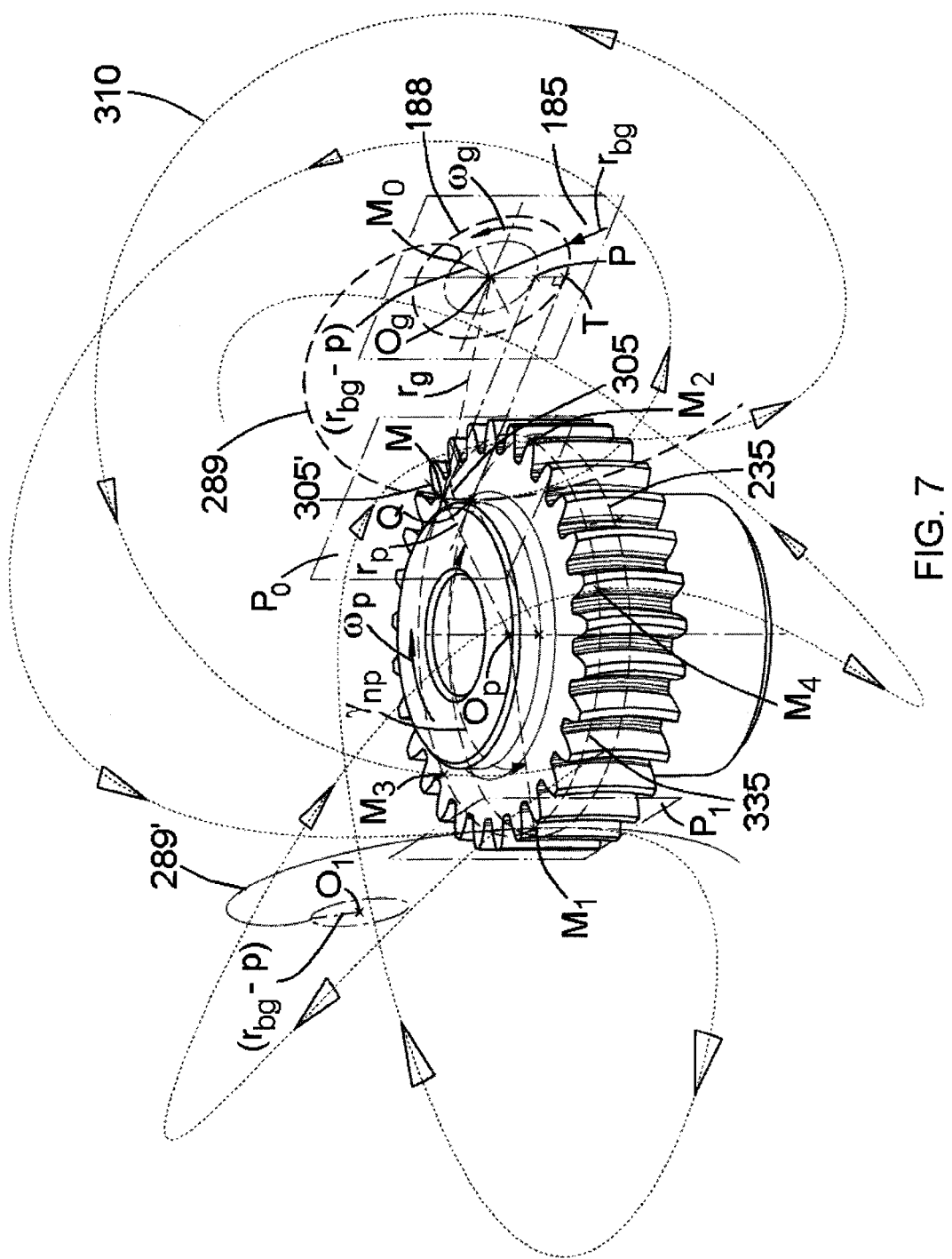
Figure 8A:
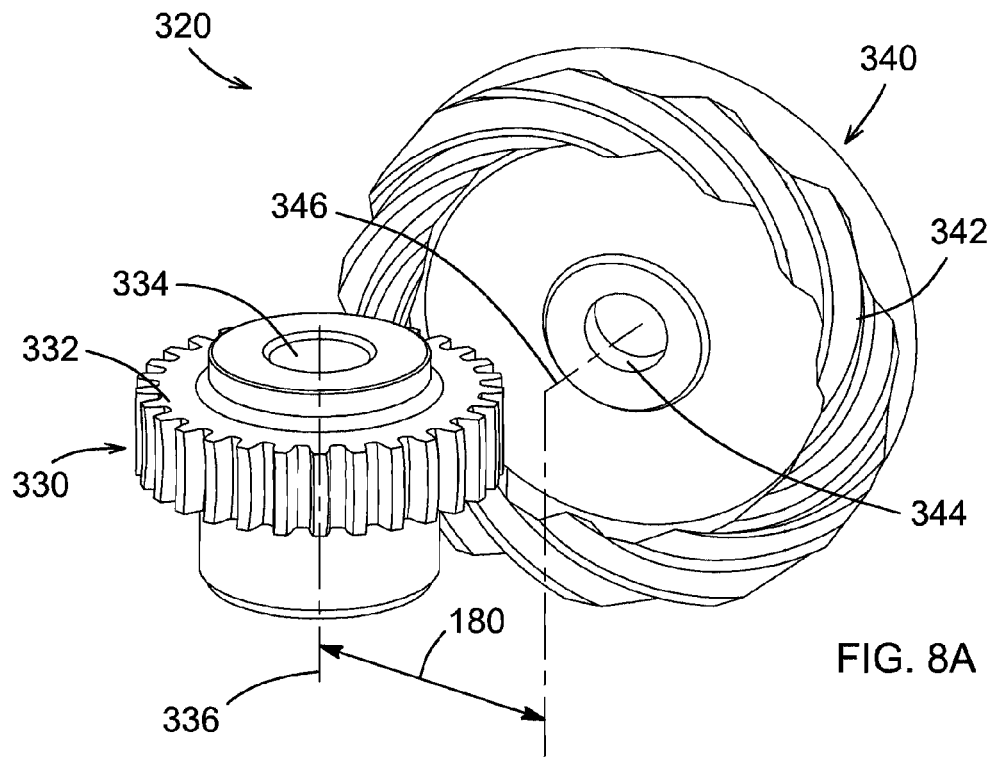
Figure 8B:
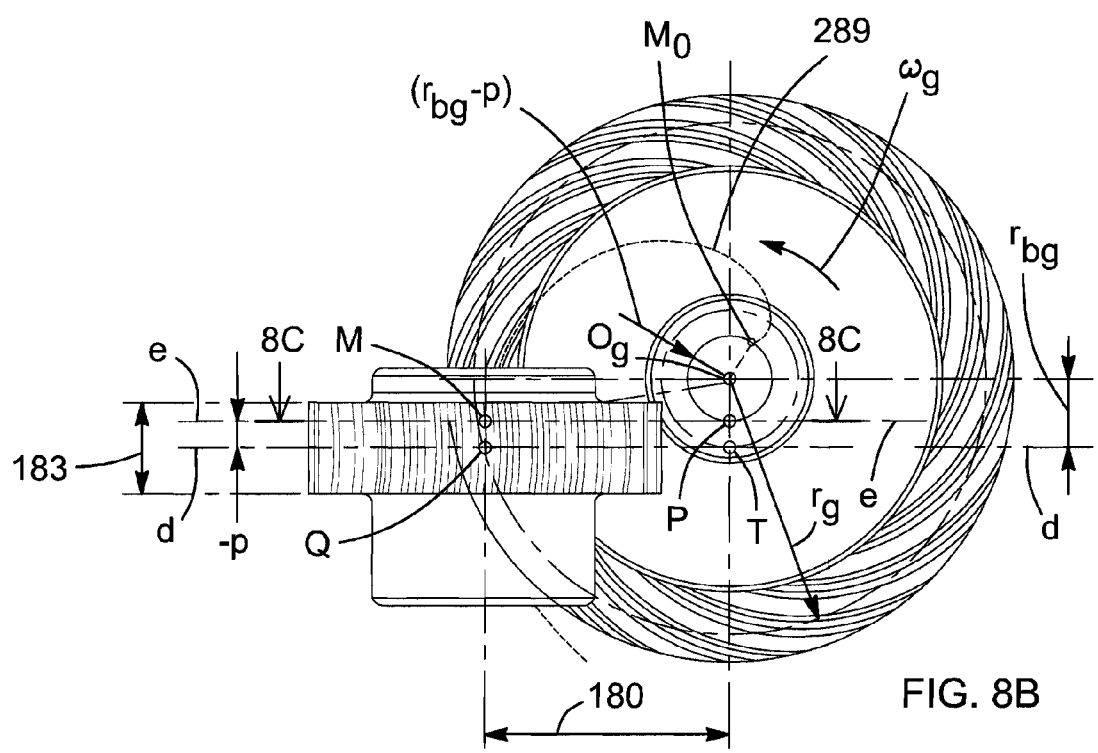
Figure 9:
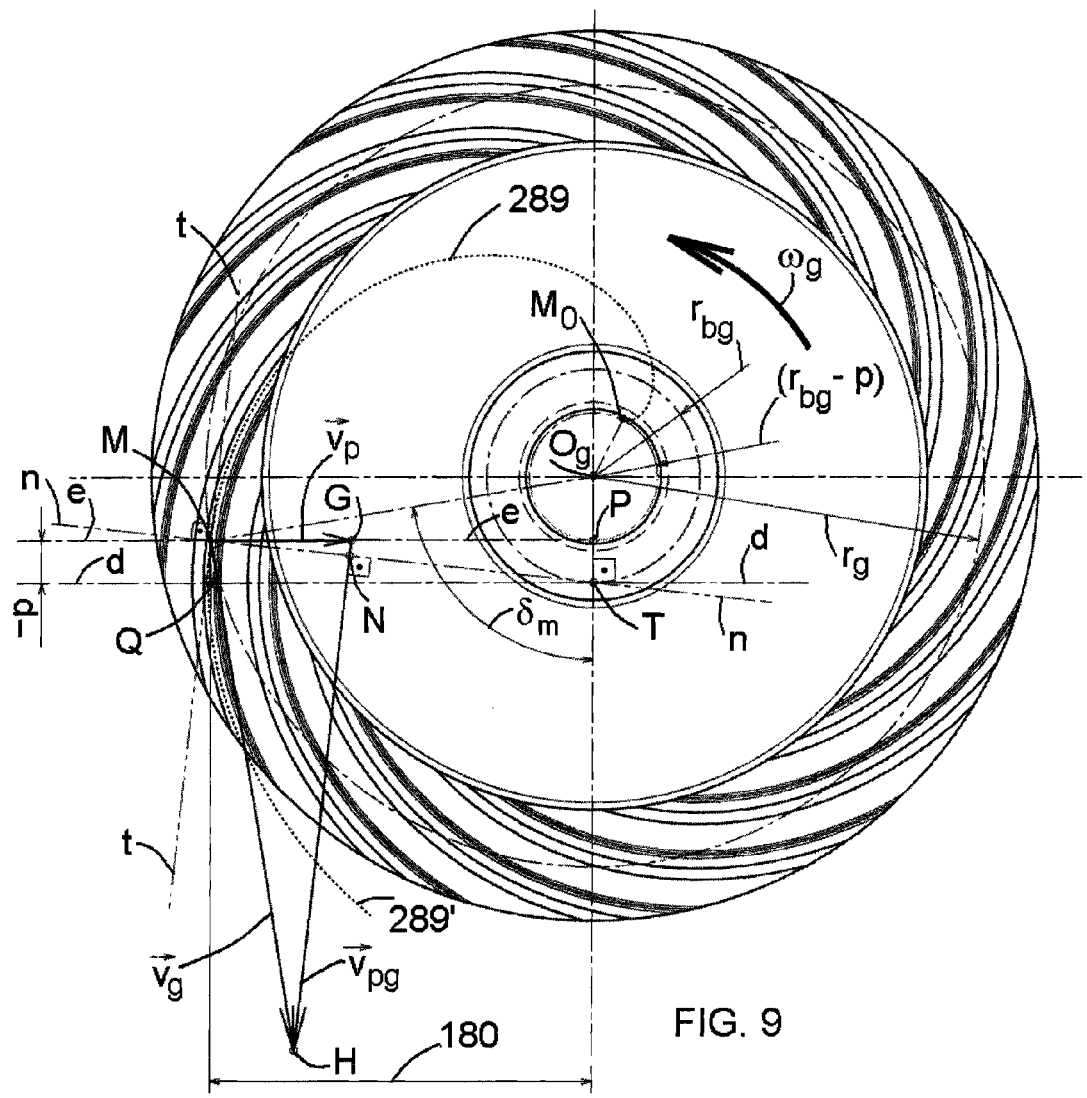
Figure 10:
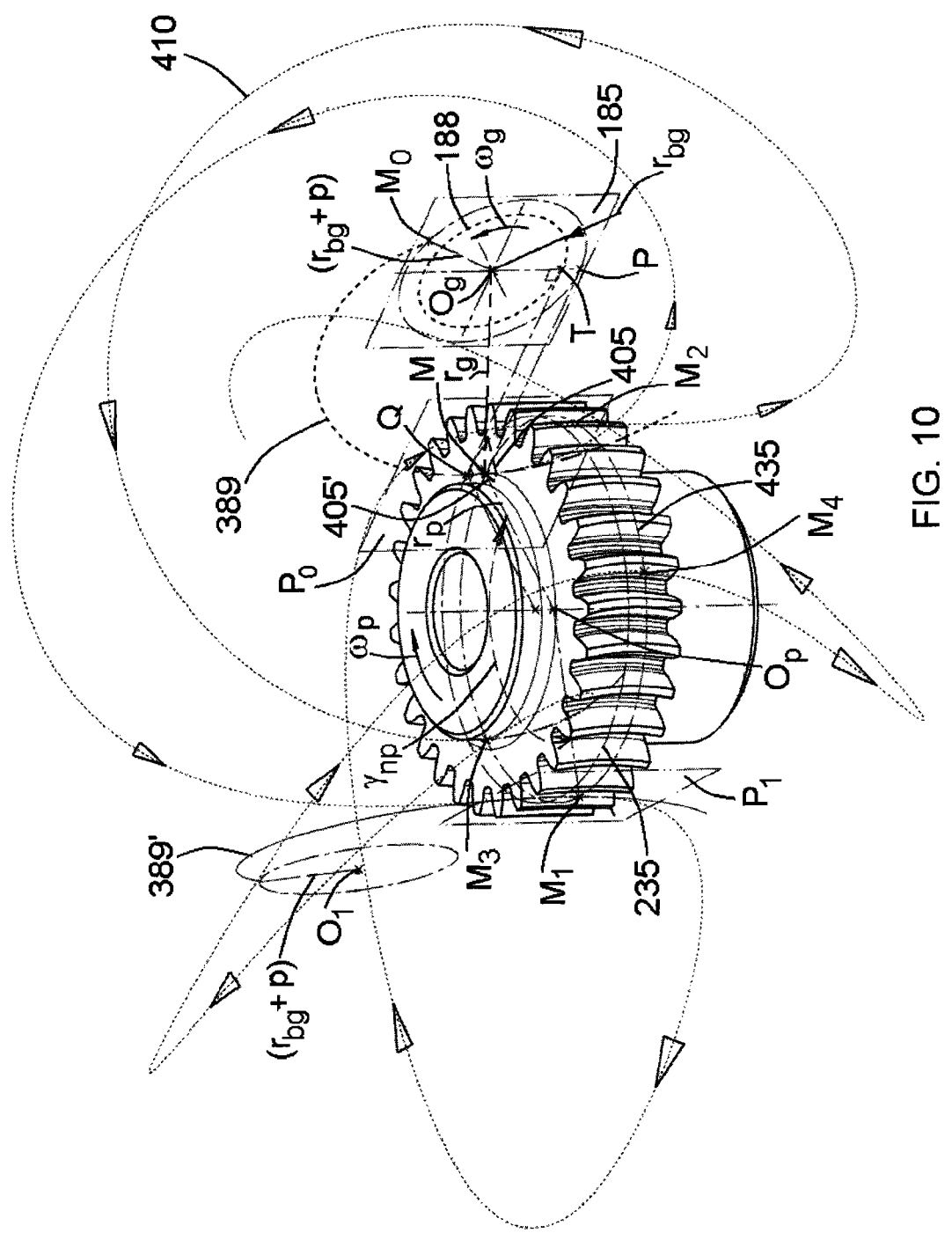
Figure 11A:
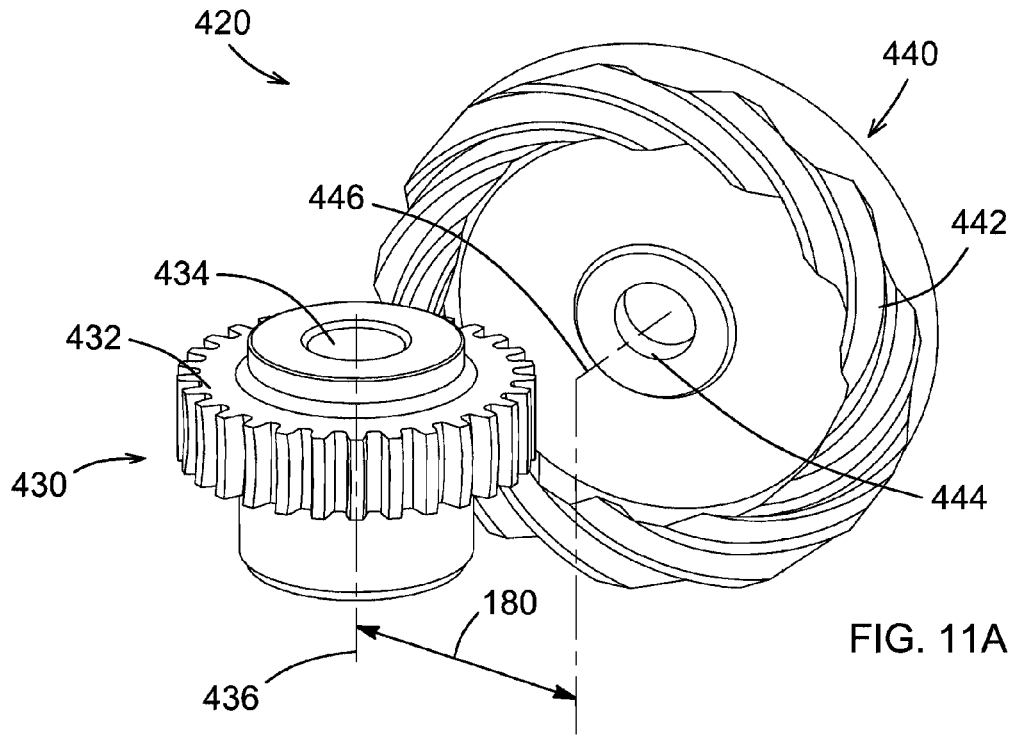
Figure 11B:
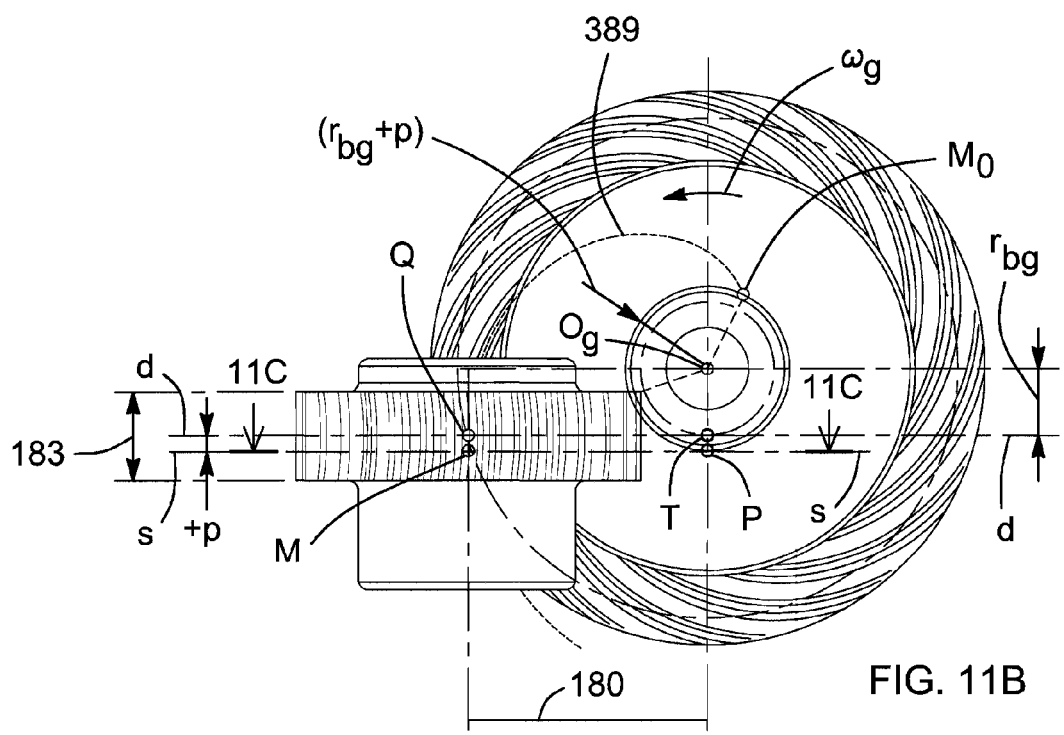
Figure 12:
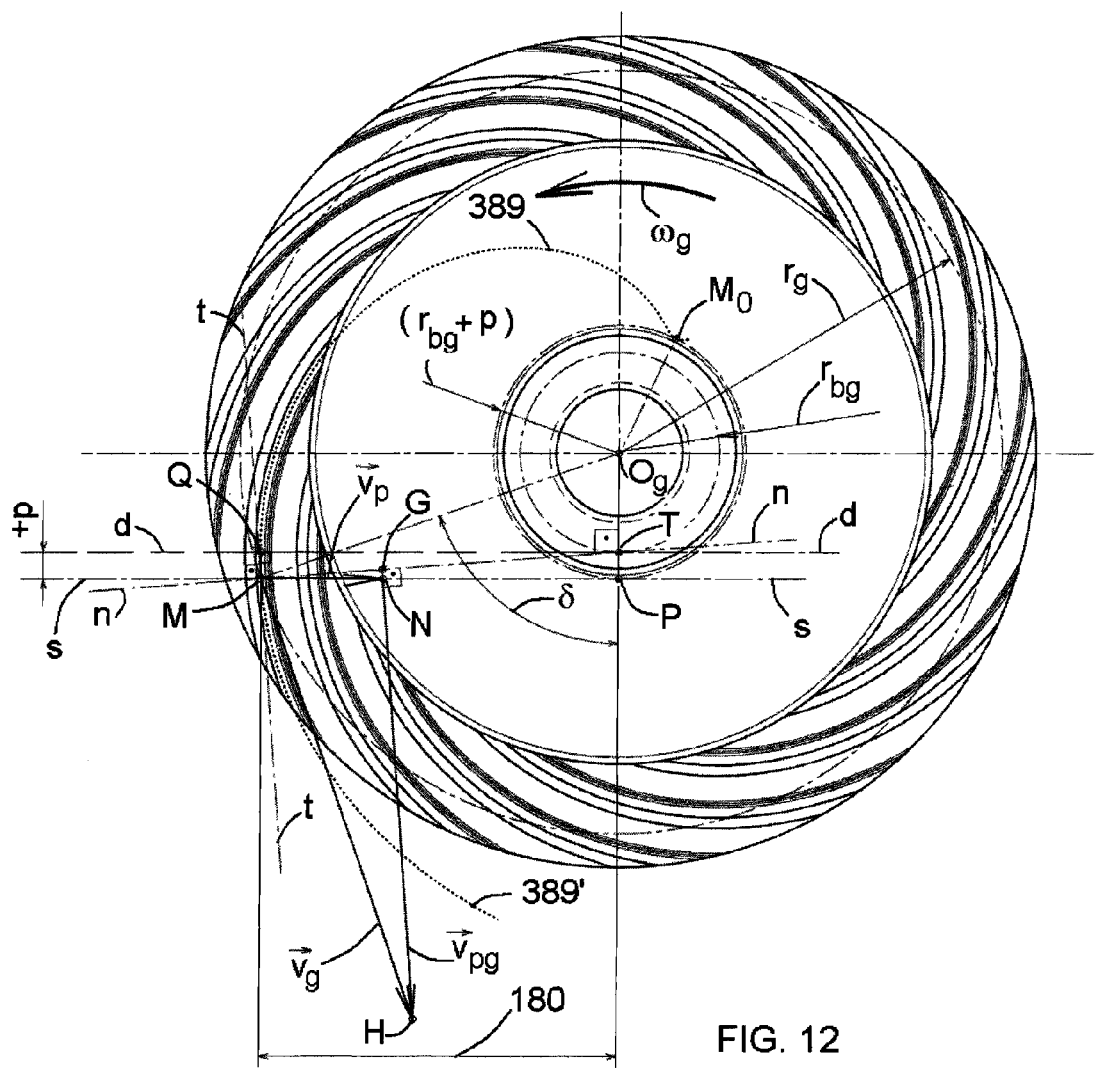
Figure 13:
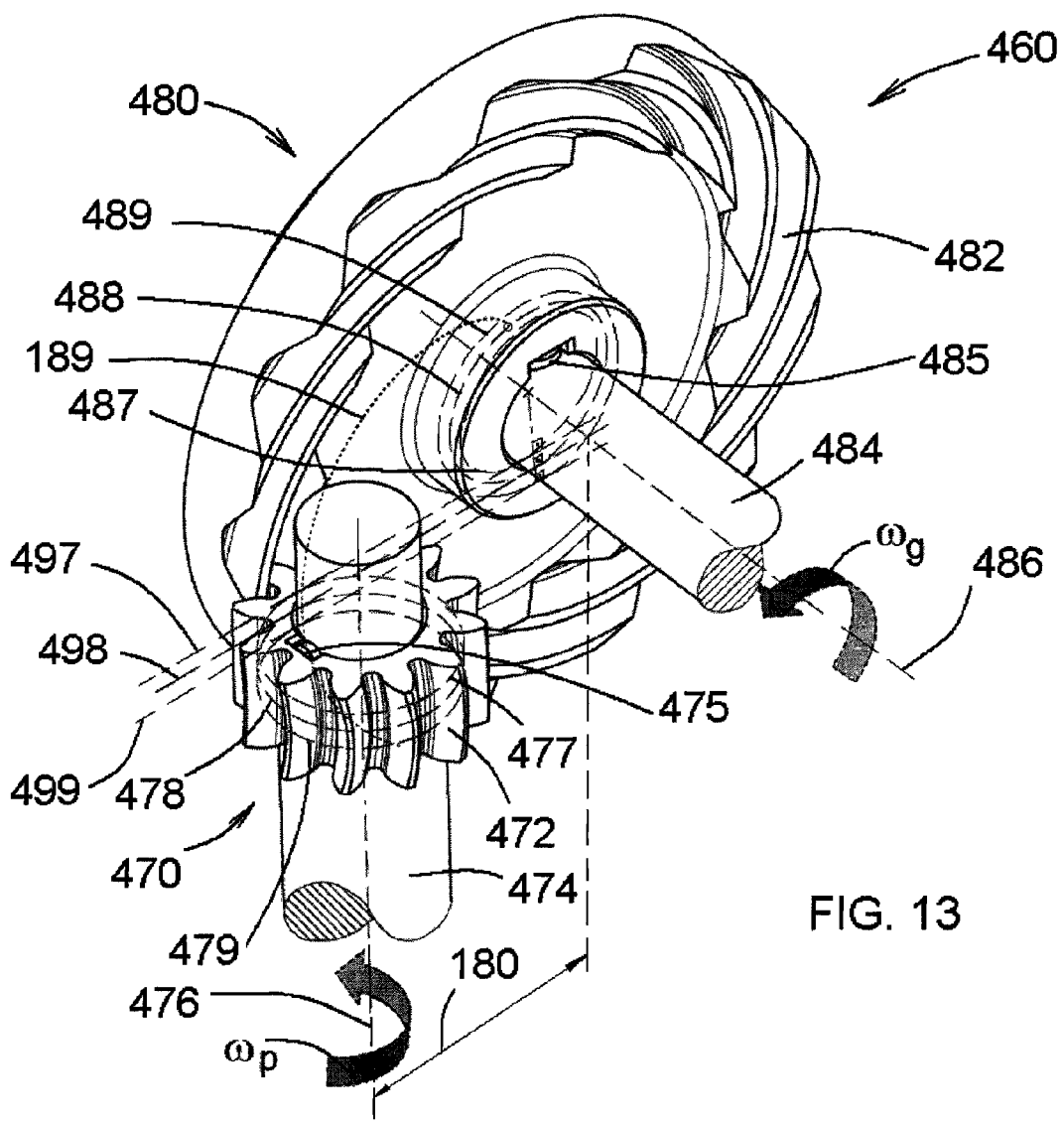
Figure 14:
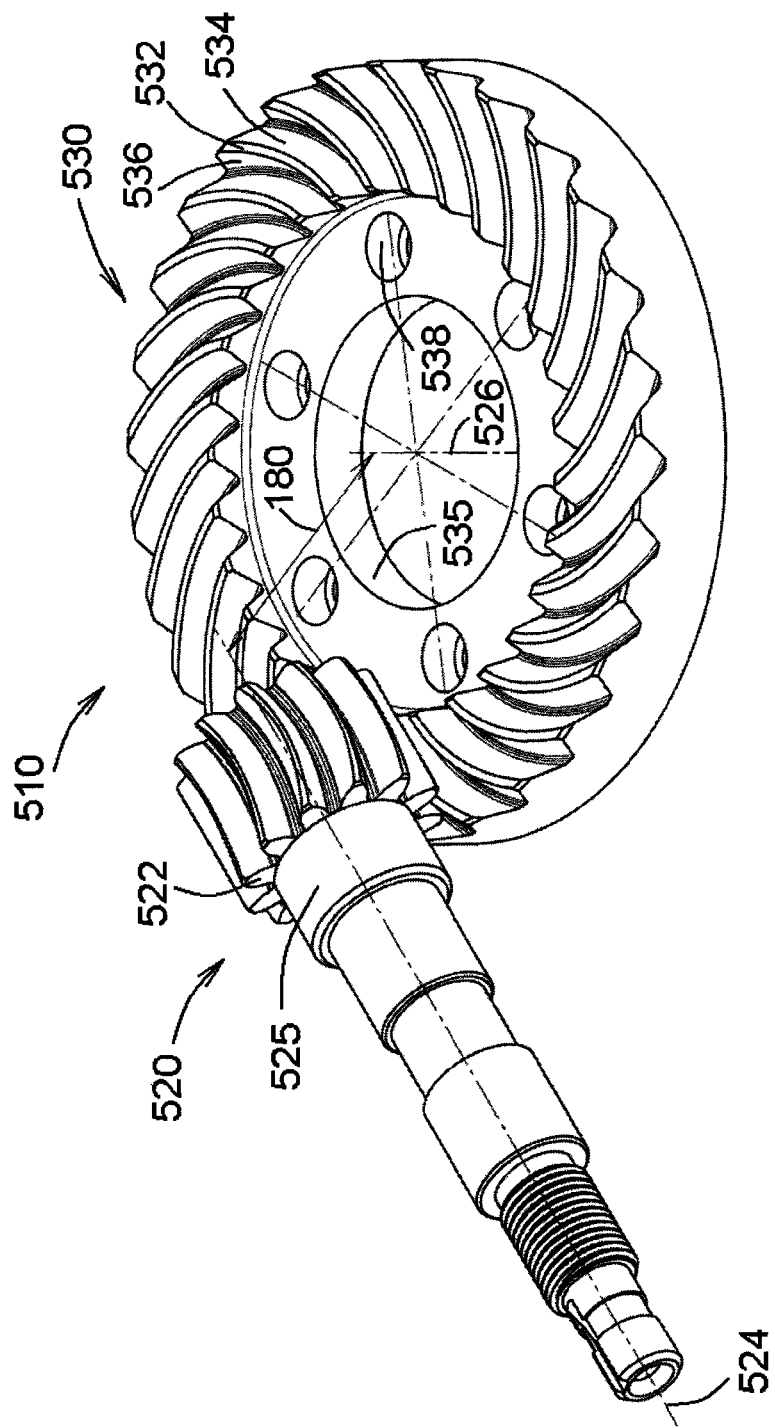
Figure 15:
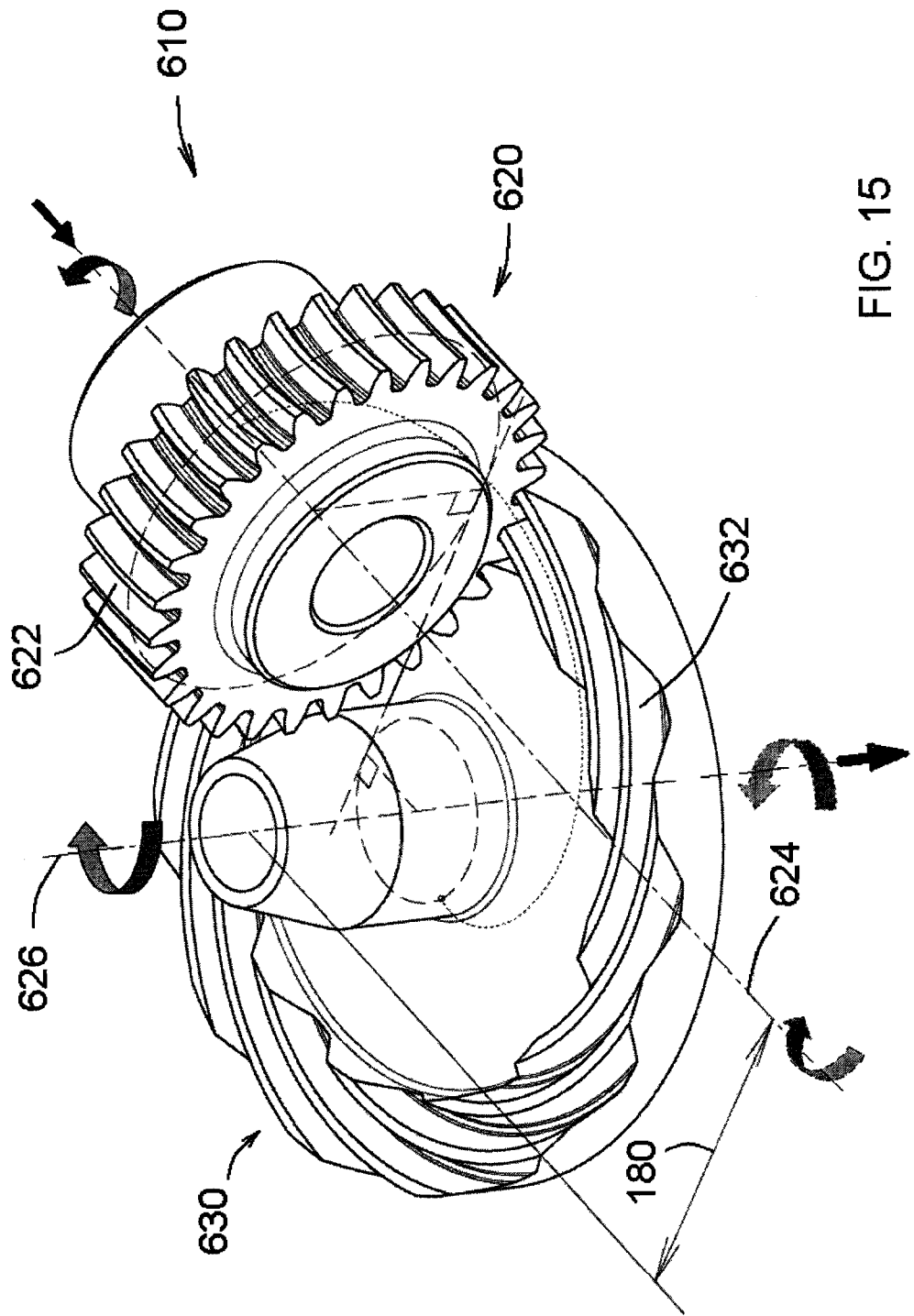
Figure 16:
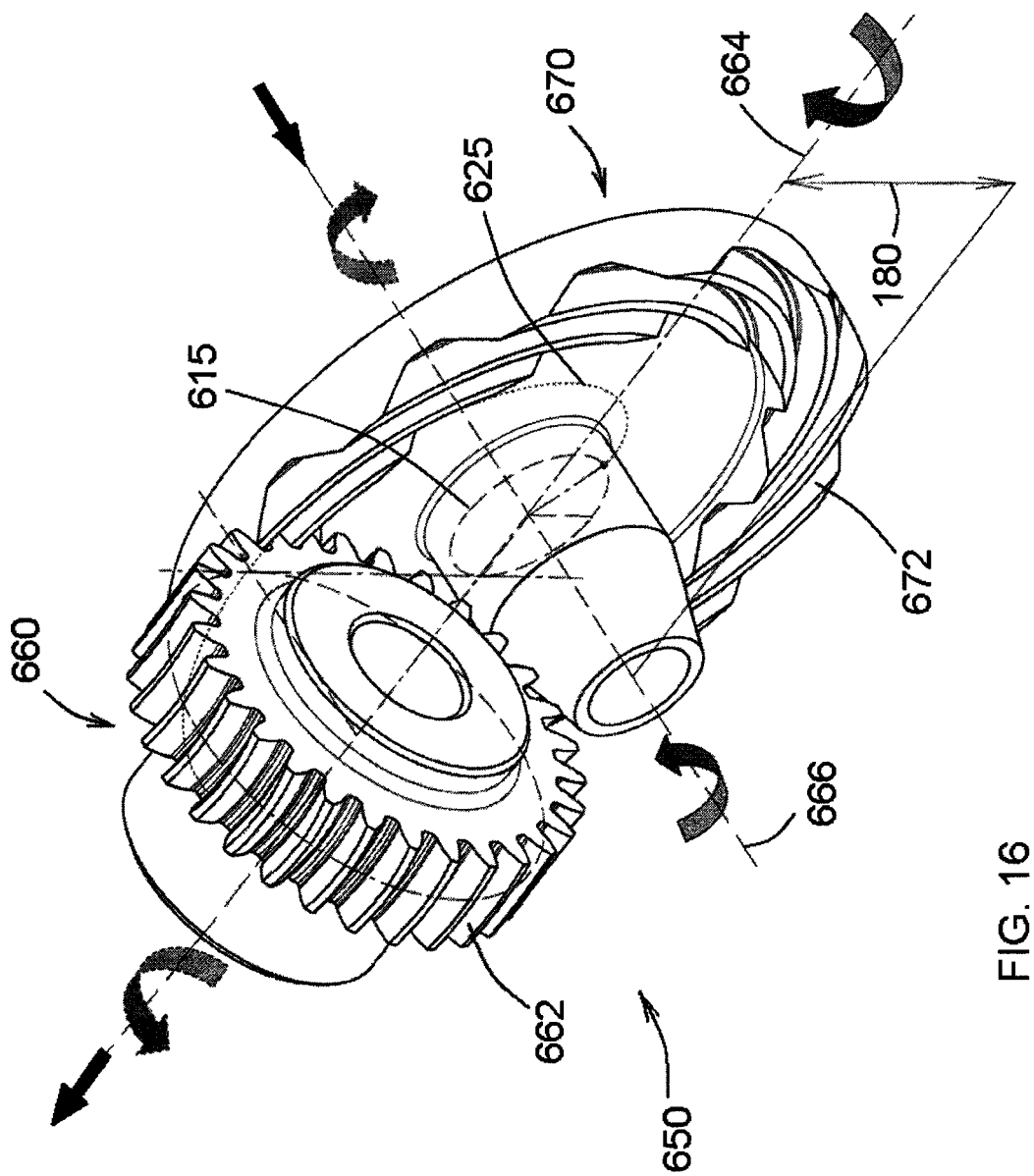
Figure 17B:
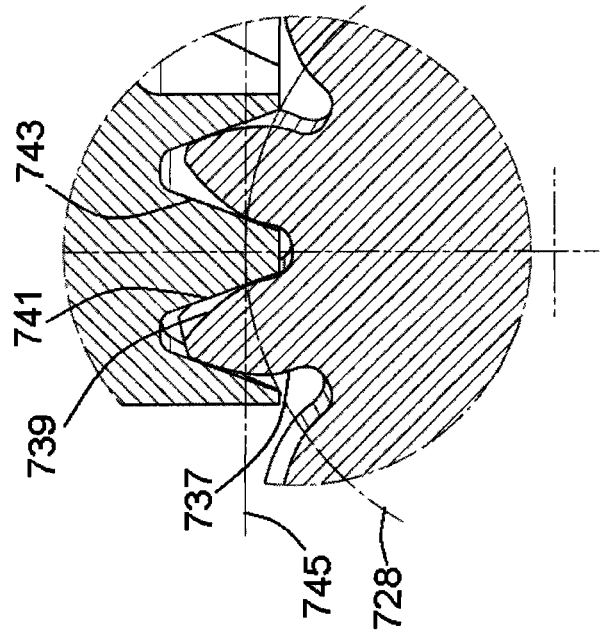
Figure 17A:
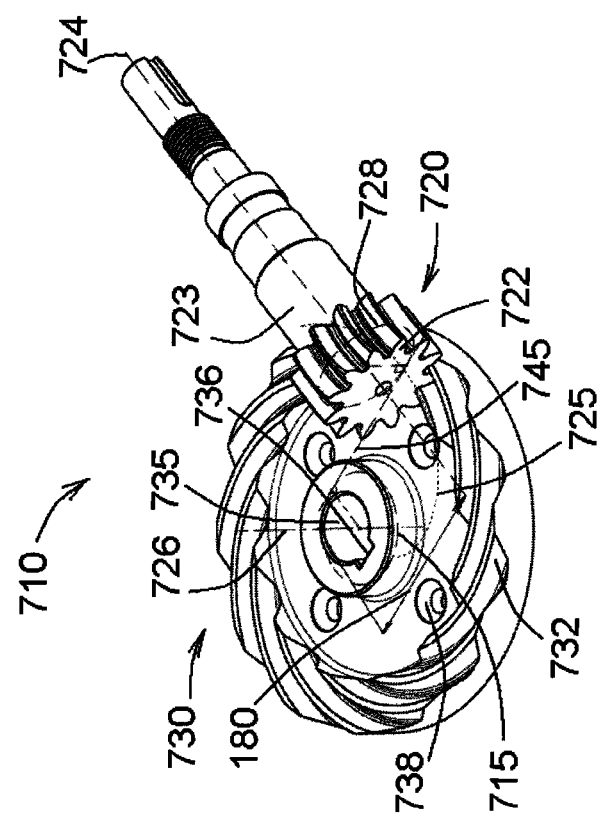
Figure 20:
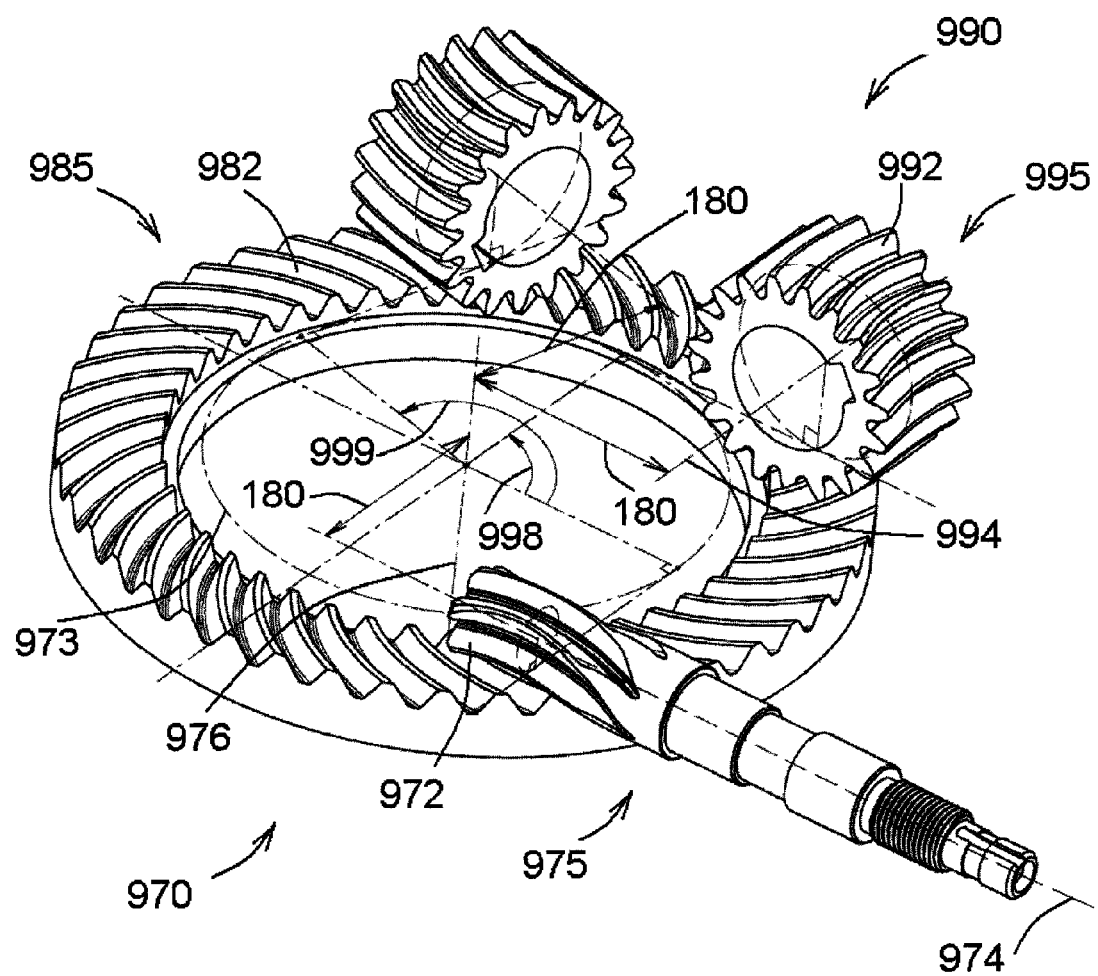

For the sake of the present invention genesis approach FIG. 3A is a perspective view of a generic double involute pinion-face gear drive system in general, and of a double involute pinion-face gear drive left-hand system in particular, and without restricting the approach generality, having the pinion and the face gear teeth longitudinally shaped as normal involute curves of the face gear base circle;

FIG. 3B is a simplified sectional perspective of the double involute pinion-face gear drive illustrated in FIG. 3A, through two perpendicular planes to each other: the face gear pitch plane and the gear drive plane of action;

FIG. 3C is a sectional perspective of the double involute pinion-face gear drive illustrated in FIG. 3A, through the face gear pitch plane defined in FIG. 3B;

FIG. 3D is a sectional perspective of the double involute pinion-face gear drive illustrated in FIG. 3A, through the gear drive plane of action defined in FIG. 3B;

FIG. 4 is a perspective view of the teeth longitudinally shape generating process simulation for a double involute pinion having its teeth shaped as portions of normal involute curves of the face gear base circle in longitudinal direction, parallel to its axis;

FIG. 5A is a perspective view of a representative double involute pinion-face gear drive according to the present invention, with both gears' teeth longitudinally shaped portions of normal involute curves of the same face gear base circle;

FIG. 5B is a plan view of a representative double involute pinion-face gear drive according to the present invention, as shown in FIG. 5A;

FIG. 5C is a partial cross-sectional view taken along the line 5C-5C of a representative double involute pinion-face gear drive according to the present invention, shown in FIG. 5B;

FIG. 5D is an enlarged detail of the partial cross-sectional view shown in FIG. 5C, of a representative double involute pinion-face gear drive according to the present invention;

FIG. 5E is an diagrammatic view of the imaginary rack-tool that generates the pinion teeth of a representative double involute pinion-face gear drive according to the present invention shown in FIG. 5A;

FIG. 5F is a partial diagrammatic detail view of pinion teeth depth profile generation simulation, as envelope of the rack-tool edges, shown in FIG. 5E for pinion with asymmetrical and symmetrical teeth;

FIG. 5G is a partial cross-sectional view taken along the line 5G-5G of a representative double involute pinion-face gear drive according to the present invention, shown in FIG. 5C;

FIG. 6 is a diagrammatic plan view showing the velocity diagram development into the face gear pitch plane, for a representative double involute pinion-face gear drive according to the present invention, shown in FIG. 5G;

FIG. 7 is a perspective view of the teeth longitudinally shape generating process simulation for a double involute pinion having its teeth shaped as portions of extended involute curves of the face gear base circle in longitudinal direction, parallel to its axis;

FIG. 8A is a perspective view of a representative double involute pinion-face gear drive according to the present invention, with both gears' teeth longitudinally shaped portions of extended involute curves of the same face gear base circle;

FIG. 8B is a plan view of a representative double involute pinion-face gear drive according to the present invention, as shown in FIG. 8A;

FIG. 8C is a partial cross-sectional view taken along the line 8C-8C of a representative double involute pinion-face gear drive according to the present invention, as shown in FIG. 8B;

FIG. 8D is an enlarged detail of the partial cross-sectional view shown in FIG. 8C, of a representative double involute pinion-face gear drive according to the present invention;

FIG. 8E is an diagrammatic view of the imaginary rack-tool that generates the pinion teeth of a representative double involute pinion-face gear drive according to the present invention shown in FIG. 8A;

FIG. 8F is a partial diagrammatic detail view of pinion teeth depth profile generation simulation, as envelope of the rack-tool edges, shown in FIG. 8E for pinion with asymmetrical and symmetrical teeth;

FIG. 8G is a partial cross-sectional view taken along the line 8G-8G of a representative double involute pinion-face gear drive according to the present invention, shown in FIG. 8C;

FIG. 9 is a diagrammatic plan view showing the velocity diagram developed into the face gear pitch plane for a representative double involute pinion-face gear drive according to the present invention, as shown in FIG. 8G;

FIG. 10 is a perspective view of the teeth longitudinally shape generating process simulation for a double involute pinion having its teeth shaped as portions of shortened involute curves of the face gear base circle in longitudinal direction, parallel to its axis;

FIG. 11A is a perspective view of a representative double involute pinion-face gear drive according to the present invention, with both gears teeth longitudinally shapes portions of shortened involute curves of the same face gear base circle;

FIG. 11B is a plan view of a representative double involute pinion-face gear drive according to the present invention, as shown in FIG. 11A;

FIG. 11C is a partial cross-sectional view taken along the line 11C-11C of a representative double involute pinion-face gear drive according to the present invention, as shown in FIG. 11B;

FIG. 11D is an enlarged detail of the partial cross-sectional view shown in FIG. 11C, of a representative double involute pinion-face gear drive according to the present invention;

FIG. 11E is an diagrammatic view of the imaginary rack-tool that generates the pinion teeth of a representative double involute pinion-face gear drive according to the present invention shown in FIG. 11A;

FIG. 11F is a partial diagrammatic detail view of pinion teeth depth profile generation simulation, as envelope of the rack-tool edges, shown in FIG. 11E for pinion with asymmetrical and symmetrical teeth;

FIG. 11G is a partial cross-sectional view taken along the line 11G-11G of a representative double involute pinion-face gear drive according to the present invention, shown in FIG. 11C;

FIG. 12 is a diagrammatic plan view showing the velocity diagram developed into the face gear pitch plane for a representative double involute pinion-face gear drive according to the present invention, as shown in FIG. 11G;

FIG. 13 is a perspective view of a generic double involute pinion-face gear drive system according to the present invention wherein the pinion and the face gear are mounted on their corresponding shafts through splines or keys;

FIG. 14 is a perspective view of a generic double involute pinion-face gear drive system according to the present invention wherein the pinion is of integrally formed shank form and the ring face gear is riveted to a flange while the later is keyed to the corresponding shaft;

FIG. 15 is a perspective view of a double involute pinion-face gear drive system according to the present invention wherein the pinion is the drive member;

FIG. 16 is a perspective view of a double involute pinion-face gear drive system according to the present invention wherein the face gear is the drive member;

FIG. 17A is a perspective view of a double involute pinion-face gear drive system embodiment according to the present invention, having the gear ratio 1:1 and the gear teeth longitudinally shape a normal involute of the face gear base circle;

FIG. 17B is a partial sectional view taken along the pinion pitch plane of a representative double involute pinion-face gear drive according to the present invention, shown in FIG. 17A;

FIG. 18A is a perspective view of a double involute pinion-face gear drive system according to the present invention, having a pinion with a small number of teeth and the gear teeth longitudinally shape a normal involute of the face gear base circle;

FIG. 18B is a top view of the double involute pinion-face gear drive system according to the present invention, shown in FIG. 18A;

FIG. 18C is a partial sectional view taken along the line 18C-18C of a representative double involute pinion-face gear drive according to the present invention, shown in FIG. 18B;

FIG. 18D is a side view of a representative double involute pinion-face gear drive system according to the present invention, shown in FIG. 18B;

FIG. 18E is an enlarged detail of the partial cross-sectional view shown in FIG. 18C, of a representative double involute pinion-face gear drive system according to the present invention;

FIG. 18F is an enlarged detail of pinion tooth undercutting of a double involute pinion-face gear drive system according to the present invention, as shown in FIG. 18A;

FIG. 18G is an enlarged detail of face gear tooth undercutting of a double involute pinion-face gear drive system according to the present invention, as shown in FIG. 18A;

FIG. 19A is a top view along face gear axis of a double involute pinion-face gear drive, system left-hand (LH), according to the present invention;

FIG. 19B is a top view along face gear axis of a double involute pinion-face gear drive, system right-hand (RH), according to the present invention;

FIG. 20 is a perspective view of a double involute pinion-face gear drive system according to the present invention, with the face gear teeth capable of meshing with the teeth of different double involute pinions having different numbers of teeth.

DETAILED DESCRIPTION

The following description is merely exemplary in nature and is not intended to limit the present disclosure, application or uses.

Figure 1:
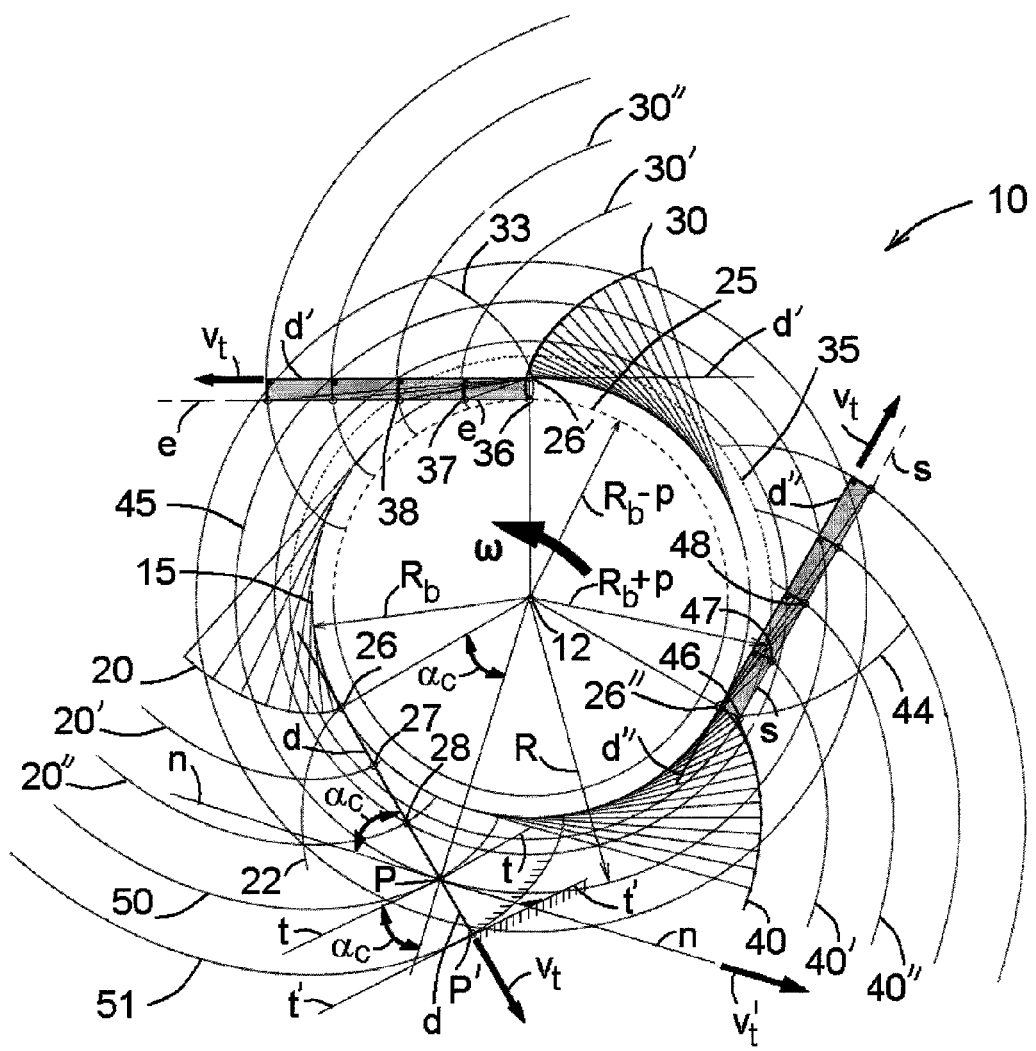
FIG. 1 is a diagram illustrating the principle of generating normal, shortened and extended involute curves of a circle in general, and of a face gear in particular, as future longitudinal shape curves for the teeth of a double involute pinion-face gear drive system.

One characteristic of this novel type of orthogonal skew-axis gearing, designated as double involute pinion-face gear drive is that the teeth shape in their longitudinal contour for both cylindrical pinion and face gear, can be normal, extended or shortened involute curves of the same face gear base circle. FIG. 1 is a diagrammatic view illustrating in general the principle of generating normal, extended and shortened involute curves of a circle of base radius $R_b$, and in particular, of a face gear base circle having the same base radius $R_b$, as pinion and face gear teeth form in longitudinal direction, designated hereinafter by the reference number 10. The diagram 10 includes a center axis 12 about which is disposed a circle 15 of radius $R_b$, designated as the face gear base circle. A normal, often designated as conventional, right-hand involute curve 20, of the face gear base circle can be generated as the trace of successive positions of a point 26 that lies on a straight line d-d, tangent to this base circle that rolls without sliding on circle 15, in clockwise direction. If the line d-d, rolls in counter-clockwise direction, a left-hand normal involute curve 22 of face gear base circle is generated, often designated as the returning branch of the already generated normal involute curve 20. A series of equally spaced points 26, 27, 28, etc., on the same line d, will generate a series of normal involute curves 20, 20', 20", etc. Such curves are non-parallel and outwardly divergent. Moreover, the normals to all these curves in each equidistant point considered 26, 27, 28, etc., will all pass through the same point 26 of instantaneous contact between the line the d-d and the base circle 15. The same series of normal involute curves can be imagined generated through an enveloping process by a rack-cutter of constant pitch (equal to the distance between the equally spaced points) and infinitesimal thickness that have the generating elements t-t, rigid and perpendicular connected to the line d-d, in all equally spaced points. By translating the rack-cutter along the line d-d, with a constant velocity $v_t$, such that the rack is permanently tangent to the base circle 15, which rotates around its center 12 with a constant angular velocity w, each normal involute curve from this series, for the sake of explanation here exemplified only by curve the 50, can be generated by an enveloping process, by the generating element t-t, that belongs to the rack-cutter tool, inclined at an angle $\alpha_c$ relative to the line that connect the current generated point P with the centre 12 of the face gear. The kinematic condition of the rack translating without sliding on the periphery of rotatable base circle 15, is given by the equation:

$$v_t = \omega \cdot R_b \tag{1}$$

A normal involute curve, for the sake of explanation here exemplified only by the curve 51, can be also generated through an enveloping process by the same rack-cutter edge t'-t', parallel to the tangent t-t and rigidly connected to another straight line n-n tangent to the face gear pitch circle 45. The edge t'-t', is translated along the line n-n with a constant linear velocity $v_t'$, such that the same rack-cutter, now rigidly connected to the line n, is permanently tangent to the pitch circle 45 while it rotates around its center 12, with the same constant angular velocity was the base circle 15 does. The new kinematic condition of the rack-cutter translating without sliding on the rotatable pitch circle 45, becomes:

$$v_t' = \frac{v_t}{\cos\alpha_c} = \frac{\omega \cdot R_b}{\cos\alpha_c} = \omega \cdot R \tag{2}$$

where R is the pitch circle radius of the face gear and $\alpha_c$ is the pressure angle of the rack-cutter tool edge.

A normal right-hand involute curve 30, of the face gear circle 25, of radius ($R_b$-p) can be generated as the trace of successive positions of a point 36 that lies on a straight line e-e, tangent to this circle 25, and that rolls without sliding on this, in clockwise direction. The same curve 30 can be considered generated by the same point 36, that lies on an orthogonal segment of magnitude p, rigidly connected to a line d'-d' in the point 26', if the line d'-d' is rolling without sliding on the face gear base circle 15 of radius $R_b$. In this case the curve 30 is designated as an extended involute curve of the same face gear base circle 15. If the line d'-d', rolls in counter-clockwise direction on the circle 15, a left-hand extended involute curve 33 of the face gear base circle is generated, often named as the returning branch of the already generated extended involute curve 30. A series of equally spaced points 36, 37, 38, etc., on the inwardly offset line e-e, rigidly connected to line d'-d' at the same offset distance p, will generate a series of extended involute curves 30, 30', 30", etc. Such curves are non-parallel and outwardly divergent also. Moreover, the normals to all these curves in each equidistant point considered 36, 37, 38, etc., will all pass through the same point 26' of instantaneous contact between the line d'-d' and the base circle 15. The same series of extended involute curves can be imagined as generated by an enveloping process by a rack-cutter, of constant pitch equal to the distance between the equidistance points and infinitesimal thickness, that have the generating elements rigid connected to the line d'-d', in all equally spaced points, while it is translated along the line d'-d', with a constant linear velocity $v_t$ given by relation (1), such that the rack-cutter is permanently tangent to the base circle 15, while it rotates around its center 12, with a constant angular velocity w. Because the rack is constantly changing its angular relation to the curves (the tangents to the curves in each point 36, 37, 38, etc., are not parallel to each other but rather slightly divergent), the generated curves will be non-parallel, and the space between the curves will progressively increase, as well as their curvature. These characteristics can be advantageously exploited when avoidance of interference and undercutting are required at face gear and double pinion teeth generation.

A normal right-hand involute curve 40, of the face gear circle 35, of radius ($R_b$+p) can be generated as the trace of successive positions of a point 46 that lies on a straight line s-s, tangent to this circle 35, and that rolls without sliding on this circle 35 in a clockwise direction. The same curve 40 can be considered generated by the same point 46, that lies on an orthogonal segment of magnitude p, rigidly connected to a line d"-d" in the point 26", if the line d"-d" is rolling without sliding on the face gear base circle 15 of radius $R_b$. In this case the curve 40 is designated as a shortened involute curve of the same face gear base circle 15. If the line d"-d", rolls in counter-clockwise direction on the circle 15, a left-hand extended involute curve 44 of the face gear base circle is generated, often designated as the returning branch of the already generated shortened involute curve 40. A series of equally spaced points 46, 47, 48, etc., on the outwardly offset line s-s, rigidly connected to line d"-d" at the same offset distance p, will generate a series of shortened involute curves 40, 40', 40", etc. Such curves are non-parallel and outwardly divergent also. Moreover, the normals to all these curves in each equally spaced point considered, 46, 47, 48, etc., will all pass through the same point 26" of instantaneous contact between the line d-d and the base circle 15.

The same series of shortened involute curves can be imagined as generated by an enveloping process by a rack-cutter, of constant pitch equal to the distance between the equally spaced points and infinitesimal thickness, that have the generating elements rigid connected to the line d"-d", in all equally spaced points, that is translated along the line d"-d", with a constant linear speed $v_t$ given by relation (1), such that the rack-cutter is permanently tangent to the base circle 15, while it rotates around its center 12, with a constant angular speed ω. Because the rack-cutter is again constantly changing its angular relation to the curves (the tangents to the curves in each point 46, 47, 48, etc., are not parallel to each other but rather slightly divergent), the generated curves will be non-parallel, and the space between the curves will progressively increase, as well as their curvature. These characteristics can be also advantageously exploited when avoidance of interference and undercutting are required in the process of face gear and double pinion teeth generation.

The main characteristic of the two series of involute curves is the fact that any series of normal, extended and/or shortened involute curves of a base circle can be arranged tangent to any other series of normal, extended and/or shortened involute curves of the same or different base circle radius. Thus, the three types of involute curves: normal, extended and shortened can be utilized as the teeth longitudinal shape curves of a novel orthogonal skew-axis gearing comprising a double involute cylindrical pinion and a face gear, as described below.

FIGS. 2A-2D are diagrammatic illustrations of a classical helical gear system teeth generation and mesh, generally designated by the reference number 100. As illustrated in FIG. 2A, the gear pair consists of a cylindrical pinion 60, having the teeth 62 disposed radially on its periphery, in mesh with a cylindrical gear 70, having its teeth 72, arranged also radially on its periphery, for the sake of explanation simplicity the two components being considered of having the same width 81. The two components have their axes, indicated here by 65 and 75, for the pinion and gear, respectively, disposed parallel to each other at a prescribed centre distance designated by 80. As indicated in FIG. 2B, two simplified sections through the gear pair base cylinders, designated by 67 for the pinion and 77 for the gear, are considered: the first section through a transverse plane 85, perpendicular to both components axes at an arbitrary distance 72 from one of the gears side face, and the second section, through a plane 90, tangent to both gears base cylinders, often designated as plane of action. The generating process of normal involute curves as the teeth profiles shape for both pinion and gear can be illustrated within the plane 85, while the sectioned teeth mesh as an inclined rack can be illustrated within the plane 90. The intersection of these two planes will be a straight line 92, tangent to both gears base circles, 78 for the pinion and 88 for the gear, often designated as the line of action for the considered transverse section 85. For this particular transverse plane, the line of action will intersect the gears centre line 93 in a point 94. Considering the line 92 as a taut string that is unwrapping from the pinion base circle while wrapping to the gear base circle, the point 94 will generate within the mobile rotatable planes connected to the pinion and gear, two involute curves 79 and 89, respectively, that will be tangent to each other at point 94, and which are used as gears teeth profile curves in the traverse plane 85.

Similarly, involute teeth profiles rotated around their own axes will be generated in all successive transverse planes parallel to plane 85. Thus, the teeth flanks surfaces result as envelops of these involute profiles from all successive transverse planes 85. The point 94 is considered the instantaneous center of rotation corresponding to this traverse section and will divide the line of centers into two segments inversely proportional to their angular velocities, such that the circles 86 and 96 will become the pinion and gear pitch circles, respectively. While the pinion and the gear will rotate with constant angular velocities $\omega_1$ and $\omega_2$, respectively, their pitch circles will roll without slipping on each other through the point 94. In FIG. 2C, a detail of gearing transverse involute profiles mesh is illustrated. The pinion and gear teeth active profiles 87 and 97, respectively, will be portions of involute profile curves 79 and 89, limited by the gears' inner and outer diameters. During uniform rotation, the pinion and gear flanks will be in a permanent contact along a line 82, that lies in their plane of action and which is inclined at angle $\beta_b$ relative to their axes direction. The contact between the pinion and gear conjugate flanks, 74 and 84, respectively, is not realized simultaneously on the entire width of the gears but rather progressively, the length of contact being variable in time, as indicated in FIG. 2D. Thus the pinion and gear teeth can be considered generated by rolling without sliding on the same rack-cutter inclined at angle $\beta_b$ relative to the gears axes common direction. Based on relation (1), the tangential speeds for the pinion and gear base circles, 78 of radius $r_{b1}$ and 88 of radius $r_{b2}$, respectively, can be expressed in this case by:

$$v_t = \omega_1 \cdot r_{b1} = \omega_2 \cdot r_{b2} \quad (3)$$

The pinion and gear teeth can be also considered generated by rolling without sliding on a similar rack-cutter inclined at angle $\beta$ relative to the gears' axes common direction, in a plane tangent to their pitch cylinders and perpendicular to their centers line 93. Based on relation (2), at the pitch point 94, the tangential speeds of pinion and gear pitch circles, 86 of radius $r_1$ and 96 of radius $r_2$, respectively, can be expressed by:

$$v_t' = \frac{\omega_1 \cdot r_{b1}}{\cos\alpha_c} = \frac{\omega_2 \cdot r_{b2}}{\cos\alpha_c} = \omega_1 \cdot r_1 = \omega_2 \cdot r_2 \quad (4)$$

where, $\omega_1$ and $\omega_2$ are the pinion and gear angular velocities, respectively, and $\alpha_c$ is the pressure angle of the rack-cutter tool edge. Thus, the gears' speed ratio becomes:

$$i_{12} = \frac{\omega_1}{\omega_2} = \frac{r_2}{r_1} = \frac{N_2}{N_1} \quad (5)$$

where $N_1$ and $N_2$ are the numbers of teeth of the pinion, considered the drive member and gear, considered the driven member, respectively.

Consider now the idea of rotating the pinion axis 65, counter-clockwise 90° around the line of action 92. Without restricting the generality of discussion, FIGS. 3A, 3B, 3C and 3D are diagrammatic illustrations of teeth generation and mesh for a novel double involute pinion-face gear drive system with normal involute longitudinally shaped teeth as designated by the reference number 200. The approach conclusions, with their inherent characteristics, are valid also for using the other two types of existing types of involute curves of the same face gear base circle, namely extended and shortened involute curves, respectively, as the gear teeth active longitudinal shapes. As illustrated in FIG. 3A, the novel gear pair consists of a cylindrical pinion 160, having the teeth 162 with convex flanks disposed radially on its periphery, in mesh with a face gear 170, having its teeth 172, of constant height and concave and convex flanks arranged on one of its end sides. The two components have their axes, indicated here by 165 and 175, for the pinion and face gear, respectively, disposed orthogonally offset to each other at a prescribed center distance designated by 180. As indicated in FIG. 3B, two simplified sections through the pinion pitch cylinder designated by 187 and through the face gear base cylinder designated by 177 are considered the first section, through a transverse plane 185, perpendicular to the face gear axis and tangent to the pinion pitch cylinder and the second section, through the plane of action 190, perpendicular to the pinion axis and tangent to the face gear base cylinder.

The generating process and the mesh of teeth depth profile shapes for both, pinion and face gear can be illustrated within the pinion pitch plane, often designated as gears teeth depth profile generating plane, which in this case coincides with the plane of action 190, while the generating process and mesh of the teeth longitudinally shapes for both, pinion and face gear, as two conjugate curved racks with curvilinear contact can be illustrated within the plane 185, often designated as the face gear pitch plane. The intersection of these two planes will be a straight line 192, tangent to both pinion pitch circle 167, and face gear base circle 188, in the points 194 and 195, respectively. The line that connects the center of the face gear base circle with the points 194 and 195 defines the angle $\delta_m$, designated as the face gear teeth medium helix angle, is calculated by:

$$\tan\delta_m = \frac{CD}{r_{bg}} \quad (6)$$

where, CD is the prescribed center distance between skew axes, designated by 180 in FIG. 3A, and $r_{bg}$ is the face gear base circle radius. FIG. 3C is a sectional perspective of the double involute pinion-face gear drive illustrated in FIG. 3A, through the face gear pitch plane defined in FIG. 3B in which the teeth longitudinal profiles mesh is illustrated. The pinion and face gear teeth active profiles 193 and 197, respectively, will be portions of normal involute curves 189' and 189, limited by pinion width 183, and face gear inner and outer diameters, 198 and 199 respectively. During the uniform rotation, the pinion and face gear flanks will be in a curvilinear contact along the conjugate flanks, 193 and 197. Thus the pinion and face gear teeth can be considered generated by rolling without sliding on the same curvilinear rack-cutter. In FIG. 3D, a detail of gearing teeth depth profiles mesh is illustrated. The pinion teeth depth profile 187 will be portion of an involute profile curve 179 limited by pinion inner and outer diameters, while the face gear teeth depth profile 196 will be a straight line 89, limited by the face gear top and root lands. Thus within the pinion pitch plane 190, the mesh between double involute pinion and face gear teeth can be considered as a standard conjugate action between a basic face gear rack and a spur involute pinion. If the pinion and face gear depth profiles generation as a normal involute curve and a straight line, respectively, are easy to understand, close attention is paid further on to the possibility of their teeth longitudinal shape generation as portions of normal, extended and shortened involute curves of the same face gear base circle. As shown in FIG. 3B, considering the line 192 as a taut string that is unwrapping from the pinion pitch circle 167 that lies in its pitch plane 190, while wrapping on the face gear base circle periphery 188, located in face gear pitch plane 185, the point 194 will generate within the face gear mobile rotatable plane connected to the face gear, a normal involute curve 189. Thus, the face gear teeth longitudinal shape is already defined. It will be shown that the pinion teeth longitudinal shape can also be a normal involute curve 189', located on a plane tangent to the pinion pitch cylinder and arranged tangent to the face gear teeth longitudinal normal involute shape curve, in the pitch point 194. Considering the particular arrangement illustrated in FIG. 3B, in which the pinion and the face gear are rotating around their axes with constant angular velocities $\omega_p$ and $\omega_g$, respectively, the taut string 192, is unwrapping from pinion pitch circle 167 of radius $r_p$, while wrapping on the face gear base cylinder of radius $r_{bg}$, with the same tangential speed:

$$v_t = \omega_p \cdot r_p = \omega_g \cdot r_{bg} \quad (7)$$

Thus, the gears speed ratio becomes:

$$i_{pg} = \frac{\omega_p}{\omega_g} = \frac{r_{bg}}{r_p} = \frac{N_g}{N_p} \quad (8)$$

where $N_p$ and $N_g$ are the numbers of teeth of the pinion (drive member) and face gear (driven member), respectively. Moreover, as illustrated in FIG. 3B, their teeth permanent contact in the pitch point 194 will be maintained if the relative speed vector $\vec{v}_{pg}$ has the same direction as the direction of the tangent t-t in the common point 194 to both pinion and face gear teeth longitudinal curves 189' and 189. Based on this observation, from FIG. 3B and relation (8), the face gear pitch circle will have the radius $r_g$ given by:

$$r_g = \frac{r_{bg}}{\cos\delta_m} = \frac{N_g \cdot r_p}{N_p \cdot \cos\delta_m} = \frac{i_{pg} \cdot r_p}{\cos\delta_m} \quad (9)$$

The same considerations, with particular peculiarities, will be proven valid for the cases in which the pinion and the face gear teeth longitudinally shaped curves are extended or shortened involute curves of the same face gear base circle 188.

Consider the pinion and the face gear with their axes disposed orthogonally offset to each other at a prescribed center distance in the particular arrangement illustrated in FIG. 4, in which the pinion pitch plane is tangent to the face gear base circle 188 of radius $r_{bg}$, in the point T. It has been mathematically proven and kinematically simulated that during uniform rotation of pinion and face gear around their axes with constant angular velocities $\omega_p$ and $\omega_g$, respectively, in the prescribed gear speed ratio given by relation (8), the locus of all points, located on a normal involute of the face gear base circle from its pitch plane, in the pinion rotatable kinematic set will be identical normal involute curves, to those from the face gear pitch plane, disposed in tangent planes connected to the pinion pitch circle (cylinder), at certain angles relative to the face gear pitch plane position, given by the following relation:

$$\gamma_{np} = n \cdot \frac{N_g}{N_p} \cdot 360^\circ \quad (10)$$

where n is an integer number. As shown in FIG. 4, following the trajectory 210 of a point M, from the reference plane $P_0$ that initially is overlapping the face gear pitch plane 185, that belongs to a normal involute 189 of the face gear base circle 188 of radius $r_{bg}$, the corresponding points generated into the pinion's rotatable kinematic set connected to its pitch circle 235 of center $O_p$ and radius $r_p$, will be the points $M_1$, $M_2$, $M_3 \ldots$, etc., that lie in tangent planes similar to $P_1$, disposed at angles $\gamma_{np}$, given by relation (10), relative to the initial position $P_0$ of the face gear pitch plane. Locus of all points $M_1$ within pinion tangent plane $P_1$ will be an identical normal involute curve 189' that can be considered as the pinion tooth longitudinally shape curve. That opens the possibility of having the double pinion teeth longitudinal shape generated by a tool-disk that has the cutting teeth edges illustrated in FIG. 4 by the segments 205 and 205', arranged on a series of equi-spaced normal involutes curves of the same face gear base circle of radius $r_{bg}$, rotated around its center $O_g$. Using the main characteristic of two series of involute curves, of the same base circles, that allows their tangent arrangement, the normal involute curves 189' and 189 theoretically overlap each other and portions of them can be used as pinion and face gear teeth longitudinal profile curves, respectively. Thus, the pinion teeth depth profile shapes will be portions of normal involute curves while their longitudinal shapes will also be portions of normal involute curves of the face gear base circle, hence the term of double involute pinion.

FIGS. 5A-5G are diagrammatic illustrations of gear teeth shape generation and mesh for a double involute pinion-face gear drive having the teeth longitudinally shape curves portions of normal involute curves of the same face gear base circle. Referring to FIG. 5A, a representative double involute pinion-face gear drive according to the present invention, with both gear teeth longitudinally shaped portions of normal involute curves of the same face gear base circle is illustrated and generally designated by the reference number 220. As utilized herein, the term "double involute" refers to the pinion in which the tooth depth profile shape and the tooth shape in the lengthwise direction are both normal involute curves. Specifically, the novel gear drive 220 includes a double involute cylindrical pinion 230 having its axis of rotation 236, in constant mesh with a face gear 240, having its axis of rotation 246 disposed neither parallel nor intersecting, but orthogonally offset at a prescribed center distance 180 relative to the first axis 236. The cylindrical pinion 230 includes a plurality of equi-spaced teeth 232, having the convex flanks of constant height, which are shaped not only in their lengthwise direction, in the form of a normal involute curve but also shaped in their depth profile direction in the form of a normal involute curve and mounted on a first shaft (not indicated here), that will be retained by its cylindrical bore 234. The double involute pinion teeth 232 will engage the teeth 242 of a disk-shaped wheel 240, having the convex and concave flanks of constant height, formed on one of the disk side faces, hence the name face gear. The face gear 240, usually the larger gear drive component, has the teeth top and root lands located in parallel planes perpendicular to its axis 246, and is mounted orthogonally offset in space on a second shaft (not shown here) retained by its bore 244.

FIG. 5B is a plan view along the face gear axis of a representative double involute pinion-face gear drive according to the present invention shown in FIG. 5A, which has the gear teeth longitudinally shaped portions of normal involute curves, of the same face gear base circle of center $O_g$ and radius $r_{bg}$, as shown here by a representative normal involute curve 189 that has the starting point $M_0$ located on the face gear base circle 188. The pinion pitch plane, illustrated in this view by the line d-d, is tangent to the face gear base circle 188, perpendicular to the pinion axis and contains the pitch point M. The pitch point M belongs to the normal involute 189 and is considered the common instant contact point of the pinion and face gear teeth profiles. FIG. 5C is a partial cross-sectional view taken along the line 5C-5C, identical with the line d-d, of the representative double involute pinion-face gear drive from FIG. 5B. The circle 235, of center $O_p$ and radius $r_p$, designated hereinafter as the pinion pitch circle is tangent to the line d-d, at the pitch point M. The face gear pitch plane, which in this case is overlapping the plane of action illustrated in this view by the line d-d, is tangent to the pinion pitch circle 235, perpendicular to the face gear axis and contains the pitch point M. As illustrated in FIG. 5D, that is an enlarged detail of the partial cross-sectional view shown in FIG. 5C, during the uniform rotation of the pinion with constant angular velocity $\omega_p$, its pitch circle tangential speed vector in the pitch point M, designated by $\vec{v}_p$ is tangent to the pinion pitch circle of radius $r_p$. Positioning the pinion pitch plane tangentially to the face gear base circle 188, in the point T, then the mesh between the face gear teeth 242 and the pinion teeth 232 within the pinion pitch plane can be considered as the mesh between a basic straight-lined shape rack which belongs to the face gear body and that translates with the tangential speed $v_p = v_t$ while the pinion rotates around its axis with constant angular velocity $\omega_p$, according to the relation (7). In the most general case, the pinion teeth drive and coast flanks designated by 237 and 238 have different pressure angles $\propto_d$ and $\propto_c$, respectively. Likewise, the face gear teeth, drive and coast flanks designated by 247 and 248 have also different pressure angles $\propto_d$ and $\propto_c$, respectively.

FIG. 5E is a diagrammatic view of teeth generation simulation, for a double involute pinion with asymmetric flanks within its pitch plane, by an asymmetric cutting-rack tool 239, having its reference line 233 tangent to the pinion blank pitch circle 235. As illustrated in FIG. 5F, which is a partial diagrammatic view of double involute pinion teeth depth involute profile generation simulation as envelope of the rack-tool edges illustrated in FIG. 5E, the pinion tooth drive and coast convex flanks depth involute profiles, designated by 237 and 238, respectively, can be of asymmetrical or symmetrical nature. The face gear convex drive and concave coast flanks, designated by 247 and 248, respectively, can be also of asymmetrical ($\propto_d \neq \propto_c$) or symmetrical ($\propto_d = \propto_c$) nature. The face gear tooth depth profile is always straight-line shaped on both, drive and coast flanks. It should be emphasized that the pinion and the face gear teeth depth profiles as normal involute curves and straight lines, respectively, are recognized only within the pinion pitch plane, often designated as the pinion and face gear teeth depth profile generating plane. On either side of the pinion pitch plane, the pinion and the face gear mating teeth depth profiles differ from the above mentioned profiles. A pure rolling motion occurs only within the gear drive plane of action. On either side of this plane, a sliding action occurs along the teeth surfaces as well, that is controlled by a proper choice of teeth surfaces curvature as well as the pinion width, designated in FIG. 5B by 183. The pinion median plane may or may not coincide with its pitch plane.

FIG. 5G is a partial cross-sectional view taken along the line 5G-5G, of a representative double involute pinion-face gear drive according to the present invention shown in FIG. 5C. The pinion and the face gear teeth are in contact along the teeth longitudinal contours, considered tangent in the pitch point M. During the uniform rotation of the face gear with constant angular velocity $\omega_g$, its pitch circle tangential speed vector in the pitch point M, designated by $\vec{v}_g$ is tangent to the face gear pitch circle of radius $r_g$. By positioning the pinion and face gear axes relative to each other as previously mentioned, the common normal n-n in the pitch point M, to the pinion and face gear teeth longitudinal contours in contact 249 and 250, respectively, will always pass through the point T of tangency between the line d-d and the face gear base circle. Thus, the point T can be considered as the instantaneous center of rotation for the teeth longitudinal contour profiles. Now, the condition of tangency of mating teeth longitudinal profiles in their common pitch point M, for a representative double involute pinion-face gear drive according to the present invention shown in FIG. 5G can be established.

FIG. 6 is a diagrammatic plan view showing the velocity diagram development into the face gear pitch plane, for a representative double involute pinion-face gear drive according to the present invention, shown in FIG. 5G. The double involute pinion-face gear drive teeth move with a combination of rolling and sliding motion during the period of their engagement. It can be proven that for any arbitrary contact position of the teeth longitudinal curves 189 and 189', that belongs to the face gear teeth and pinion teeth, respectively, the common normal n-n at the common contact point M passes through the instantaneous point T, of rolling without slipping of straight line d-d on face gear base circle. The condition that the two longitudinal curves 189 and 189' will remain in contact at the pitch point M is satisfied when the pinion and face gear tangential speed vector projections onto the common normal n-n will be equal. According to FIG. 6, and based on condition of similar triangles MNH and $O_g$TM, the following relation can be established:

$$\frac{v_g}{v_p} = \frac{r_g}{r_{bg}} \tag{11}$$

Knowing that:

$$v_p = \omega_p \cdot r_p \tag{12}$$

$$v_g = \omega_g \cdot r_g \tag{13}$$

$$i_{pg} = \frac{\omega_p}{\omega_g} = \frac{N_g}{N_p} \tag{14}$$

and based on relations (11), (12) and (13), the gears speed ratio expression (14), becomes:

$$i_{pg} = \frac{r_{bg}}{r_p} = \frac{N_g}{N_p} \quad (15)$$

Within the obvious relation:

$$\frac{r_{bg}}{N_g} = \frac{r_p}{N_p} \quad (16)$$

multiplying the numerators by 2π, the expression of gear drive constant pitch can be determined as follows:

$$p = \frac{2\pi \cdot r_{bg}}{N_g} = \frac{2\pi \cdot r_p}{N_p} = m \cdot \pi \quad (17)$$

where, m is the novel gear drive modulus. Thus, the double involute pinion and face gear teeth longitudinal profiles correctly mesh with each other if the direction of the relative speed vector is parallel to the common tangent t-t direction at pitch point M, and the teeth have a constant pitch given by relation (17). Based on FIG. 6, the expression of face gear pitch radius $r_g$ can be determined as a function of face gear teeth medium helix angle $\delta_m$, which has the practical range limits between 30° and 45°:

$$r_g = \frac{r_{bg}}{\cos\delta_m} \quad (18)$$

While the pinion and the face gear will rotate with constant angular velocities $\omega_p$ and $\omega_g$, respectively, their pitch circles of radii $r_p$ and $r_g$, situated within the pinion pitch plane and the face gear pitch plane, respectively, will roll on each other without slipping, being in permanent contact in the pitch point M.

Consider the pinion and the face gear with their axes disposed orthogonally offset to each other at a prescribed center distance in the particular arrangement illustrated in FIG. 7, in which the pinion pitch plane is tangent to the face gear circle of radius ($r_{bg}$−p), at the point P, where p is the magnitude of teeth longitudinal involute shape curve modification. It was mathematically proven and kinematically simulated that during uniform rotation of pinion and face gear around their axes with constant angular velocities $\omega_p$ and $\omega_g$, respectively, in the prescribed gear speed ratio given by relation (8), the locus of all points, located on an extended involute of the face gear base circle from its pitch plane, in the pinion rotatable kinematic set will be identical extended involute curves, to those from the face gear pitch plane, disposed in tangent planes connected to the pinion pitch circle (cylinder), at certain angles relative to the face gear pitch plane position, given by the same relation (10). As shown in FIG. 7, following the trajectory 310 of a point M, from the reference plane $P_0$ that initially is overlapping the face gear pitch plane 185, that belongs to an extended involute 289 of the face gear base circle 188 of radius $r_{bg}$, the corresponding points generated into the pinion's rotatable kinematic set connected to its pitch circle 335 of center $O_p$ and radius $r_p$, will be the points $M_1$, $M_2$, $M_3$ . . . etc., that lie in tangent planes similar to $P_1$, disposed at angles $\gamma_{np}$, given by relation (10), relative to the initial position $P_0$ of the face gear pitch plane. The locus of all points $M_1$ within the pinion tangent plane $P_1$ will be an identical extended involute curve 289' that can be considered as the pinion tooth longitudinal shape curve. That opens the possibility of having the double involute pinion teeth longitudinally shape generated by a tool-disk that has the cutting teeth edges illustrated in FIG. 7 by the segments 305 and 305', arranged on a series of equi-spaced extended involutes curves of the same face gear base circle of radius $r_{bg}$, rotated around its center $O_g$. Using the main characteristic of two series of involute curves, of the same base circles, that allows their tangent arrangement, the extended involute curves 289' and 289 theoretically overlap each other and portions of them can be used as pinion and face gear teeth longitudinal profile curves, respectively. Thus, the pinion teeth depth profile shapes will be portions of normal involute curves while their longitudinal shapes will be portions of extended involute curves of the face gear base circle, hence the term of double involute pinion.

FIGS. 8A-8G are diagrammatic illustrations of gear teeth shape generation and mesh for a double involute pinion-face gear drive having the teeth longitudinally shape curves portions of extended involute curves of the same face gear base circle. Referring to FIG. 8A, a representative double involute pinion-face gear drive according to the present invention, with both gears teeth longitudinally shape curves portions of extended involute curves of the same face gear base circle is illustrated and generally designated by the reference number 320. As utilized herein, the term "double involute" refers to the pinion in which the tooth depth profile shape is a normal involute curve while the tooth shape in the lengthwise direction is an extended involute curve. Specifically, the novel gear drive 320 includes a double involute cylindrical pinion 330 having its axis of rotation 336, in constant mesh with a face gear 340, having its axis of rotation 346 disposed neither parallel nor intersecting, but orthogonally offset at a prescribed center distance 180 relative to the first axis 336. The cylindrical pinion 330 includes a plurality of equi-spaced teeth 332, having the convex flanks of constant height, which are shaped in their lengthwise direction, in the form of an extended involute curve while also shaped in their depth profile direction in the form of a normal involute curve and is mounted on a first shaft (not indicated here), that will be retained by its cylindrical bore 334. The double involute pinion teeth 332 will engage the teeth 342 of a disk-shaped wheel 340, having the convex and concave flanks of constant height, formed on one of the disk side faces, hence the name face gear. The face gear 340, usually the larger gear drive component, has the teeth top and root lands located in parallel planes perpendicular to its axis 346, and is mounted orthogonally offset in space on a second shaft (not shown here) retained by its bore 344. FIG. 8B is a plan view along the face gear axis of a representative double involute pinion-face gear drive according to the present invention shown FIG. 8A, which has the gear teeth longitudinally shaped portions of extended involute curves, of the same face gear base circle of center $O_g$ and radius $r_{bg}$, as shown here by a representative extended involute curve 289 that has the starting point $M_0$ located on the face gear circle of radius ($r_{bg}$−p). The pinion pitch plane, illustrated in this view by the line e-e, is now tangent to the face gear circle of radius ($r_{bg}$−p), perpendicular to the pinion axis and contains the pitch point M. Obviously, in this case the pinion pitch plane is parallel inwardly to the gear drive plane of action, illustrated in this view by the line d-d. The pitch point M belongs to the extended involute 289 and is considered the common instant contact point of the pinion and face gear teeth profiles. Moreover, the pitch point M is considered orthogonally rigid connected to the point Q on the line of action d-d that is tangent to the face gear base circle 188 in the point T. FIG. 8C is a partial cross-sectional view taken along the line 8C-8C, identical with the line e-e, of the representative double involute pinion-face gear drive from FIG. 8B. The circle 335, of center $O_p$ and radius $r_p$, designated hereinafter as the pinion pitch circle is tangent to the line e-e, at the pitch point M. The face gear pitch plane, illustrated in this view by the line e-e, is tangent to the pinion pitch circle 335, perpendicular to the face gear axis and contains the pitch point M. As illustrated in FIG. 8D, that is an enlarged detail of the partial cross-sectional view shown in FIG. 8C, during the uniform rotation of the pinion with constant angular velocity $\omega_p$, its pitch circle tangential speed vector at the pitch point M, designated by $\vec{v}_p$ is tangent to the pinion pitch circle of radius $r_p$. Positioning the pinion pitch plane tangentially to the face gear circle of radius: $(r_{bg}-p)$, at the point P, then the mesh between the face gear teeth 342 and the pinion teeth 332 within the pinion pitch plane can be considered as the mesh between a basic straight-line shaped rack which belongs to the face gear body and that translates with the tangential speed $v_p = v_t$ while the pinion rotates around its axis with constant angular velocity $\omega_p$, according to the relation (7). In the most general case, the pinion teeth drive and coast flanks designated by 337 and 338 have different pressure angles $\alpha_d$ and $\alpha_c$, respectively. Likewise, the face gear teeth, drive and coast flanks designated by 347 and 348 have also different pressure angles $\alpha_d$ and $\alpha_c$, respectively.

FIG. 8E is a diagrammatic view of teeth generation simulation, for a double involute pinion with asymmetric flanks within its pitch plane, by an asymmetric cutting-rack tool 339, having its reference line 333 tangent to the pinion blank pitch circle 335. As illustrated in FIG. 8F, which is a partial diagrammatic view of double involute pinion teeth depth involute profile generation simulation as envelope of the rack-tool edges as illustrated in FIG. 8E, the pinion tooth drive and coast convex flanks depth involute profiles, designated by 337 and 338, respectively, can be of asymmetrical or symmetrical nature. The face gear convex drive and concave coast flanks, designated by 347 and 348, respectively, can be also of asymmetrical ($\alpha_d \neq \alpha_c$) or symmetrical ($\alpha_d = \alpha_c$) nature. The face gear tooth depth profile is always a straight line on both, drive and coast flanks. It should be emphasized that the pinion and the face gear teeth depth profiles, as normal involute curves and straight lines, respectively, are recognized only within the pinion pitch plane, often designated as the pinion and face gear teeth depth profile generating plane. On either side of the pinion pitch plane, the pinion and the face gear mating teeth depth profiles differ from the above mentioned profiles. As mentioned before, a pure rolling motion occurs only within the gear drive plane of action. On either side of this plane, a sliding action occurs along the teeth surfaces as well, that is controlled by a proper choice of teeth surface curvatures as well as the pinion width, designated in FIG. 8B by 183. The pinion median plane may or may not coincide with its pitch plane.

FIG. 8G is a partial cross-sectional view taken along the line 8G-8G, of a representative double involute pinion-face gear drive according to the present invention shown in FIG. 8C. The pinion and the face gear teeth are in contact along the teeth longitudinal contours, considered tangent at the pitch point M. During uniform rotation of the face gear with constant angular velocity $\omega_g$, its pitch circle tangential speed vector at the pitch point M, designated by $\vec{v}_g$ is tangent to the face gear pitch circle of radius $r_g$. By positioning the pinion and face gear axes relative to each other as previously mentioned, the common normal n-n at the pitch point M, to the pinion and face gear teeth longitudinal contours in contact 349 and 350, respectively, will always pass through the point T of tangency between the line d-d and the face gear base circle. Thus, the point T can be considered as the instantaneous center of rotation for the teeth longitudinal contour profiles. Now, the condition of tangency of mating teeth longitudinal profiles at their common pitch point M, for a representative double involute pinion-face gear drive according to the present invention shown in FIG. 8G can be established.

FIG. 9 is a diagrammatic plan view showing the velocity diagram development into the face gear pitch plane, for a representative double involute pinion-face gear drive according to the present invention, shown in FIG. 8G. The double involute pinion-face gear drive teeth move with a combination of rolling and sliding motion during the period of their engagement. It can be proven that for any arbitrary contact position of the teeth longitudinally curves 289 and 289', that belongs to the face gear teeth and pinion teeth, respectively, the common normal n-n at the common contact point M passes through the instantaneous point T, of rolling without slipping of straight line d-d on face gear base circle. The condition that the two longitudinal curves 289 and 289' will remain in contact at the pitch point M is satisfied when the pinion and face gear tangential speed vector projections onto the common normal n-n will be equal. According to FIG. 9, and based on a condition of similar triangles MGH and $O_gTM$, the following relation can be established:

$$\frac{v_g}{v_p} = \frac{r_g}{r_{bg}} \quad (19)$$

Based on relations (11), (12) and (13), the gear speed ratio expression (14), becomes in this case:

$$i_{pg} = \frac{r_{bg}}{r_p} = \frac{N_g}{N_p} \quad (20)$$

a relation which is structurally identical to the relation (15). Obviously, the relations (17) and (18) are valid in this case too.

Consider the pinion and the face gear with their axes disposed orthogonally offset to each other at a prescribed center distance in the particular arrangement illustrated in FIG. 10, in which the pinion pitch plane is tangent to the face gear circle of radius $(r_{bg}+p)$, at the point P, where p is the magnitude of teeth longitudinal involute shape curve modification. It was mathematically proven and kinematically simulated that during uniform rotation of pinion and face gear around their axes with constant angular velocities $\omega_p$ and $\omega_g$, respectively, in the prescribed gear speed ratio given by relation (8), the locus of all points, located on a shortened involute of the face gear base circle from its pitch plane, in the pinion rotatable kinematic set will be identical shortened involute curves, to those from the face gear pitch plane, disposed in tangent planes connected to the pinion pitch circle (cylinder), at certain angles relative to the face gear pitch plane position, given by the same relation (10). As shown in FIG. 10, following the trajectory 410 of a point M, from the reference plane $P_0$ that initially is overlapping the face gear pitch plane 185, that belongs to a shortened involute 389 of the face gear base circle 188 of radius $r_{bg}$, the corresponding points generated into the pinion's rotatable kinematic set connected to its pitch circle 435 of center $O_p$ and radius $r_p$, will be the points $M_1$, $M_2$, $M_3$ . . . etc., that lie in tangent planes similar to $P_1$, disposed at angles $\gamma_{np}$, given by relation (10), relative to the initial position $P_0$ of the face gear pitch plane.

The locus of all points $M_1$ within pinion tangent plane $P_1$ will be an identical extended involute curve 389' that can be considered as a pinion tooth longitudinally shaped curve. That opens the possibility of having the double pinion teeth longitudinal shape generated by a tool-disk that have the cutting teeth edges illustrated in FIG. 10 by the segments 405 and 405', arranged on a series of equi-spaced shortened involutes curves of the same face gear base circle of radius $r_{bg}$, rotated around its center $O_g$. Using the main characteristic of two series of involute curves, of the same base circles, that allows their tangent arrangement, the shortened involute curves 389' and 389 theoretically overlap each other and portions of them can be used as pinion and face gear teeth longitudinal profile curves, respectively. Thus, the pinion teeth depth profile shapes will be portions of normal involute curves while their longitudinal shapes will be portions of shortened involute curves of the face gear base circle, hence the term of double involute pinion.

FIGS. 11A-11G are diagrammatic illustrations of gear teeth shape generation and mesh for a double involute pinion-face gear drive having the teeth longitudinally shaped portions of shortened involute curves of the same face gear base circle. Referring to FIG. 11A, a representative double involute pinion-face gear drive according to the present invention, with both gear teeth longitudinally shaped portions of shortened involute curves of the same face gear base circle is illustrated and generally designated by the reference number 420. As utilized herein, the term "double involute" refers to the pinion in which the tooth depth profile shape is a normal involute curve while the tooth shape in the lengthwise direction is a shortened involute curve. Specifically, the novel gear drive 420 includes a double involute cylindrical pinion 430 having its axis of rotation 436 in constant mesh with a face gear 440, having its axis of rotation 446 disposed neither parallel nor intersecting, but orthogonally offset at a prescribed center distance 180 relative to the first axis 436. The cylindrical pinion 430 includes a plurality of equi-spaced teeth 432, having the convex flanks of constant height, which are shaped in their lengthwise direction, in the form of a shortened involute curve while also shaped in their depth profile direction in the form of a normal involute curve and is mounted on a first shaft (not indicated here), that will be retained by its cylindrical bore 434. The double involute pinion teeth 432 will engage the teeth 442 of a disk-shaped wheel 440, having the convex and concave flanks of constant height, formed on one of the disk side faces, hence the name of the face gear. The face gear 440, usually the larger gear drive component, has the teeth top and root lands located in parallel planes perpendicular to its axis 446, and is mounted orthogonally offset in space on a second shaft (not shown here) retained by its bore 444.

FIG. 11B is a plan view along the face gear axis of a representative double involute pinion-face gear drive according to the present invention shown in FIG. 11A, which has the gear teeth longitudinally shaped portions of shortened involute curves, of the same face gear base circle of center $O_g$ and radius $r_{bg}$, as shown here by a representative shortened involute curve 389 that has the starting point $M_0$ located on the face gear circle of radius $(r_{bg}+p)$. The pinion pitch plane, illustrated in this view by the line s-s, is now tangent to the face gear circle of radius $(r_{bg}+p)$, perpendicular to the pinion axis and contains the pitch point M. Obviously, in this case the pinion pitch plane is parallel outwardly to the gear drive plane of action, illustrated in this view by the line d-d. The pitch point M belongs to the shortened involute curve 389 and is considered the common instant contact point of the pinion and face gear teeth profiles. Moreover, the pitch point M is considered orthogonally rigid connected to the point Q on the line d-d that is tangent to the face gear base circle 188 at the point T. FIG. 11C is a partial cross-sectional view taken along the line 11C-11C, identical with the line s-s, of the representative double involute pinion-face gear drive from FIG. 11B. The circle 435, of center $O_p$ and radius $r_p$, designated hereinafter as the pinion pitch circle is tangent to the line s-s, at the pitch point M. The face gear pitch plane, illustrated in this view by the line s-s, is tangent to the pinion pitch circle 435, perpendicular to the face gear axis and contains the pitch point M. As illustrated in FIG. 11D, that is an enlarged detail of the partial cross-sectional view shown in FIG. 11C, during the uniform rotation of the pinion with constant angular velocity $\omega_p$, its pitch circle tangential speed vector in the pitch point M, designated by $\vec{v}_p$ is tangent to the pitch circle of radius $r_p$. Positioning the pinion pitch plane tangentially to the face gear circle of radius radius $(r_{bg}+p)$, in the point P, the mesh between the face gear teeth 442 and the pinion teeth 432 within the pinion pitch plane can be considered as the mesh between a basic straight-line shape rack which belongs to the face gear body and that translates with the tangential speed $v_p = v_t$ while the pinion rotates around its axis with constant angular velocity $\omega_p$, according to the relation (7). In the most general case, the pinion teeth drive and coast flanks designated by 437 and 438 have different pressure angles $\propto_d$ and $\propto_c$, respectively. Likewise, the face gear teeth, drive and coast flanks designated by 447 and 448 have also different pressure angles $\propto_d$ and $\propto^c$, respectively.

FIG. 11E is a diagrammatic view of teeth generation simulation, for a double involute pinion with asymmetric flanks within its pitch plane, by an asymmetric cutting-rack tool 439, having its reference line 433 tangent to the pinion blank pitch circle 435. As illustrated in FIG. 11F, which is a partial diagrammatic view of double involute pinion teeth depth involute profile generation simulation as envelope the rack-tool edges as illustrated in FIG. 11E, the pinion tooth drive and coast convex flanks depth involute profiles, designated by 437 and 438, respectively, can be of asymmetrical or symmetrical nature. The face gear convex drive and concave coast flanks, designated by 447 and 448, respectively, can be also of asymmetrical ($\propto_c \neq \propto_c$,) or symmetrical ($\propto_d = \propto_c$,) nature. The face gear tooth depth profile is always straight-lined on both, drive and coast flanks. It should be emphasized that the pinion and the face gear teeth depth profiles, as normal involute curves and straight lines, respectively, are recognized only within the pinion pitch plane, often designated as the pinion and face gear teeth depth profile generating plane. On either side of the pinion pitch plane, the pinion and the face gear mating teeth depth profiles differ from the above mentioned profiles. As mentioned before, a pure rolling motion occurs only within the gear drive plane of action. On either side of this plane, a sliding action occurs along the teeth surfaces as well, that is controlled by a proper choice of teeth surface curvatures as well as the pinion width, designated in FIG. 11B by 183. The pinion median plane may or may not coincide with its pitch plane.

FIG. 11G is a partial cross-sectional view taken along the line 11G-11G, of a representative double involute pinion-face gear drive according to the present invention shown in FIG. 11C. The pinion and the face gear teeth are in contact along the teeth longitudinal contours, considered tangent in the pitch point M. During the uniform rotation of the face gear with constant angular velocity $\omega_g$, its pitch circle tangential speed vector at the pitch point M, designated by $\vec{v}_g$ is tangent to the face gear pitch circle of radius $r_g$. By positioning the pinion and face gear axes relative to each other as previously mentioned, the common normal n-n at the pitch point M, to the pinion and face gear teeth longitudinal contours in contact 449 and 450, respectively, will always pass through the point T of tangency between the straight line d-d and the face gear base circle. Thus, the point T can be considered as the instantaneous center of rotation for the teeth longitudinal contour profiles. Now, the condition of tangency of mating teeth longitudinal profiles in their common pitch point M, for a representative double involute pinion-face gear drive according to the present invention shown in FIG. 11G can be established.

FIG. 12 is a diagrammatic plan view showing the velocity diagram development into the face gear pitch plane, for a representative double involute pinion-face gear drive according to the present invention, shown in FIG. 11G. The double involute pinion-face gear drive teeth move with a combination of rolling and sliding motion during the period of their engagement. It can be proven that for any arbitrary contact position of the teeth longitudinally curves 389 and 389', that belongs to the face gear teeth and pinion teeth, respectively, the common normal n-n at the common contact point M passes through the instantaneous point T, of rolling without slipping of straight line d-d on face gear base circle. The condition that the two longitudinal curves 389 and 389' will remain in contact at the pitch point M is satisfied when the pinion and face gear tangential speed vector projections onto the common normal n-n will be equal. According to FIG. 12, and based on a condition of similar triangles MGH and $O_g$TM, the following relation can be established:

$$\frac{v_g}{v_p} = \frac{r_g}{r_{bg}} \quad (21)$$

Based on relations (11), (12) and (13), the gears speed ratio expression (14), becomes in this case:

$$i_{pg} = \frac{r_{bg}}{r_p} = \frac{N_g}{N_p} \quad (22)$$

a relation which is also structurally identical to the relation (15). Obviously, the relations (17) and (18) are also valid in this case too.

Referring now to FIG. 13, a representative double involute pinion-face gear drive system according to the present invention is illustrated and generally designated by the reference number 460. As utilized herein, the term "double involute" refers to the pinion in which the tooth depth profile shape is a normal involute curve while the tooth shape in the lengthwise direction can be a normal involute curve, designated here by 189, or either extended or shortened involute curves (not shown here) of the same face gear base circle 488. The double involute pinion-face gear drive 460 includes a double involute pinion 470 and a face gear 480 in constant mesh with the pinion 470. The pinion 470 includes a plurality of gear teeth 472 and is disposed on a first shaft 474 which defines a reference axis 476 which is orthogonal (perpendicular to) and offset from a second shaft 484 with its reference axis 486 upon which the face gear 480 is disposed. Similarly, the face gear 480 includes a plurality of teeth 482 curved along the normal involute curve designated here by 189, or either extended or shortened involute curves (not shown here) of the same face gear base circle 488 which relates to the generation of all three types of involute curves as face gear teeth shape in the lengthwise direction. The pinion pitch circle of radius $r_p$ is designated here by the circle 478, for the pinion tooth shape a normal involute curve in the lengthwise direction, and is only schematically represented by the circles 477 and 479 of the same radius $r_p$ for the pinion tooth shape an extended and a shortened involute curve, respectively, in lengthwise direction. The pinion 470 and the face gear 480 are preferably disposed and oriented so that a reference line 498 which is tangent to the pinion pitch circle 478 is also tangent to the face gear base circle 488 of radius $r_{bg}$. So configured and oriented, the rotation with constant angular velocity $\omega_p$ of the pinion 470 on its reference axis 476 will cause the face gear 480 to rotate with constant angular velocity $\omega_g$, on its reference axis 486, according to relations (14) and (15). Thus, a true angular velocity is transmitted between the first, pinion shaft 474 and the second face gear shaft 484 that are positioned orthogonally and offset from one another at the prescribed center distance 180. In this case, the teeth of both the pinion and the face gear are curved in the lengthwise direction along a normal involute curve. Furthermore, positioning the pinion such that its pitch circle 477 is tangent to the reference line 497 which is also tangent to the circle 487 of radius ($r_{bg}$-p), concentric to the base circle 488 and inside of it, a true angular velocity is transmitted between the pinion shaft 474 and the face gear shaft 484, which are positioned orthogonally and offset from one another at the prescribed center distance 180. In this case, the teeth of both the pinion and the face gear are curved in the lengthwise direction along an extended involute curve, where p is the amount of involute curve modification. Similarly, positioning the pinion such that its pitch circle 479 is tangent to the reference line 499 which is also tangent to the circle 489 of radius ($r_{bg}$+p), concentric to the base circle 488 and outside of it, a true angular velocity is transmitted between the pinion shaft 474 and the face gear shaft 484, which are positioned orthogonally and offset from one another at the prescribed center distance 180. In this case, the teeth of both the pinion and the face gear are curved in the lengthwise direction along a shortened involute curve, where p is the amount of involute curve modification. As illustrated in FIG. 13, the pinion and the face gear may be connected to their corresponding shafts by the keys 475 and 485, respectively, or through splines (not shown here). It should be mentioned that for all three types of gear drives within the double involute pinion-face gear drive system, the pinions and the face gears teeth depth profiles are normal involute curve and straight line profiles, respectively, within the corresponding pinion pitch planes.

In FIG. 14, another embodiment of a representative double involute pinion-face gear drive system according to the present invention is illustrated and generally designated by the reference number 510. The gear drive 510 includes a pinion 520 having a plurality of gear teeth 522 with convex involute profile in a section perpendicular to pinion axis 524, which is offset at the center distance 180 from a second orthogonal axis 526 on and about which a face gear 530 is disposed and rotates. The face gear 530 includes a plurality of spiral teeth 532 formed in its face plane, with convex and concave bearing surfaces designated by 534 and 536. In this embodiment, the pinion 520 is rotatable about its axis 524 by means of an integrally formed shank 525, while the driven member 530 is of ring-shaped wheel type having a central bore 535 and multiple holes 538 through which the face gear is guided and riveted to a flange (not shown here), while the later is keyed to a corresponding shaft having the axis of rotation identical to face gear axis 526. By way of example and illustration only, the pinion 520 includes nineteen involute teeth 522, longitudinally curved along an extended involute curve, while the face gear 530 includes twenty-nine teeth 532, longitudinally curved along the same extended involute curve of the face gear base circle. As noted above, the pinion 520 is the input or drive gear and according to relation (20), the ratio of input speed to output speed is 29/19 or 1.526. The gear drive reduction ratio will be 19/29 or 0.655:1. Thus, this particular gear drive can be considered simultaneously an angular speed reducer and a torque increaser device.

Referring now to FIG. 15, a first exemplary double involute pinion-face gear drive in which the pinion is the drive gear is illustrated and designated by the reference number 610. The first double involute pinion-face gear drive system 610 includes a pinion 620 having a plurality of involute teeth 622 longitudinally curved along a normal involute curve 625 and disposed on a first axis 624. By way of example and illustration only, the pinion 620 includes twenty-nine involute teeth 622. The first axis 624, the axis of the pinion 620, is offset a distance 180 from a second, orthogonal axis 626 on and about which a face gear 630 is disposed and rotates. The face gear 630 includes a plurality of teeth 632 longitudinally curved along the same normal involute curve 625 of the face gear base circle 615 By way of example and illustration only, the face gear 630 includes twelve involute teeth 632. As noted above, the pinion 620 is the input or drive gear, and according to relation (15), the ratio of input speed to output speed is 12/29 or 0.414. The gear drive reduction ratio will be 29/12 or 2.416. Thus, this particular gear drive can be considered simultaneously an angular speed increase and a torque decrease device.

Referring to FIG. 16, a second exemplary double involute pinion-face gear drive in which a face gear is the drive gear is illustrated and designated by the reference number 650. The second double involute pinion-face gear drive system 650, which is structurally identical to the first double involute face gear drive system 610, includes a pinion 660 having a plurality of involute teeth 662 longitudinally curved along a normal involute curve 625 and is disposed on a first axis 664. By way of example and illustration only, the pinion 660 includes twenty-nine involute gear teeth 662. The first axis 664, the axis of the pinion 660, is offset a distance 180 from a second, orthogonal axis 666 on and about which a face gear 670 is disposed and rotates. The face gear 670 includes a plurality of involute teeth 672 longitudinally curved along the same normal involute curve 625 of the face gear base circle 615. By way of example and illustration only, the face gear 670 includes twelve involute gear teeth 672. As noted above, the face gear 670 is the input or drive gear and according to a relation similar to relation (15), the ratio of input speed to output speed is now 29/12 or 2.416. The gear drive reduction ratio will be 12/29 or 0.414. Thus, this particular gear drive can be considered in this case simultaneously an angular speed reducer and a torque increasing device.

Thus, it should be understood that the double involute pinion-face gear systems 610 and 650 according to the present invention are not only capable of bi-rotational motion, that is, they may rotate in either a clockwise or counterclockwise direction but also capable of bi-directional (or reversible) torque transfer, that is, either the pinion 620 or the face gear 670 may be the drive (input) gear and either the face gear 630 or the pinion 660 may be the driven (output) gear. It should be mentioned though, that for particular values of the low and high gear ratio, combined with particular values of face gear medium helix angle as well as particular values of pinion and face gear teeth materials friction coefficients, the novel gear drive may be experiencing the self-locking feature.

It should also be understood that a double involute pinion-face gear drive assembly according to the present invention may readily have the same number of teeth on the pinion as well as on the face gear. Referring to FIG. 17A, an exemplary double involute pinion-face gear drive in which the pinion is the drive gear is illustrated by the reference number 710. The double involute pinion-face gear drive system 710 includes a pinion 720 having a plurality of involute teeth 722 longitudinally curved along a normal involute curve 725 and disposed on a first axis 724. By way of example and illustration only, the pinion 720 includes twelve involute teeth 722. The first axis 724, the axis of the pinion 720, is offset a distance 180 from a second, orthogonal axis 726 on and about which a face gear 730 is disposed and rotates. The face gear 730 includes a plurality of teeth 732 longitudinally curved along the same normal involute curve 725 of the face gear base circle 715. In this embodiment the pinion 720 is rotatable about its axis 724 by means of an integrally formed shank 723, while the driven member 730 is of a ring-shaped wheel type having a central bore 735, a key feature 736 and multiple holes 738, through which the face gear is guided, keyed and riveted, respectively, to a rotatable flange (not shown here), having the axis if rotation identical to the face gear axis 726. By way of example and illustration only, the face gear 730 includes also twelve involute teeth 732. As illustrated in FIG. 17B, within pinion pitch plane, which is perpendicular to the pinion axis 724 and contains the pinion pitch circle 728, the pinion teeth 724 have both symmetrical flanks 737 and 739 of convex shape and normal involute profile, while the face gear teeth 732 have both a symmetrical, convex flank 741 and a concave flank 743 of straight-line profile, when the pinion pitch circle 728 is arranged tangent to the line 745, the later tangent as well to the face gear base circle 715. As noted above, the pinion 720 is the input or drive gear, and according to relation (15), the ratio of input speed to output speed is 12/12 or 1.0. The gear drive reduction ratio will be also 12/12 or 1:1 (unity), which is, the input speed and torque and the output speed and torque are the same (neglecting the efficiency losses). Thus, this particular gear drive can be considered as an angular speed and torque direction changing device.

It should be understood that a double involute pinion-face gear drive system according to the present invention may experience undercutting in the process of gear drive teeth manufacturing, especially for high gear ratios with pinions having a small number of teeth. Referring to FIGS. 18A-18G, another representative double involute pinion-face gear drive is illustrated and generally designated by the reference number 810. As illustrated in FIG. 18A, the double involute pinion-face gear drive system 810 includes a pinion 820 having a plurality of involute teeth 822, longitudinally curved along a normal involute curve and disposed on a first axis 824. By way of example and illustration only, the pinion 820 includes six involute teeth 822. The first axis 824, the axis of the pinion 820, is offset a distance 180 from a second, orthogonal axis 826 on and about which a face gear 830 is disposed and rotates. The face gear 830 includes a plurality of teeth 832 longitudinally curved along the same normal involute curve of the face gear base circle 815, shown in FIG. 18B. In this embodiment, the pinion 820 is rotatable about its axis 824 by means of an integrally formed shank 823, while the driven member 830 is of a ring-shaped wheel type having a central bore 835 and multiple holes 838 made on the face gear side opposed to the face gear teeth, through which the face gear is guided and riveted, respectively, to a rotatable flange (not shown here), having the axis if rotation identical to the face gear axis 826. By way of example and illustration only, the face gear 830 includes forty-five involute teeth 832. As illustrated in FIG. 18E, which is an enlarged detail of the partial cross-sectional view shown in FIG. 18C, along the line 18C-18C from FIG. 18B, that is perpendicular to the pinion axis 824 and tangent to face gear base circle 815, the pinion teeth 824 have both symmetrical flanks 837 and 839 of convex shape and normal involute profile, while the face gear teeth 832 have both a symmetrical, convex flank 841 and a concave flank 843 of straight-line profile, when the pinion pitch circle 828 is arranged tangent to the line 845, the later tangent as well to the face gear base circle 815. As noted above, the pinion 820 is the input or drive gear, and according to the relation (15), the ratio of input speed to output speed is 45/6 or 7.5. The gear drive reduction ratio will be 6/45 or 0.133. Thus, this particular gear drive can be considered in this case simultaneously an angular speed reducer and a torque increasing device. During the pinion teeth generating process, an undercutting phenomenon may appear on the pinion tooth surface, as illustrated in FIG. 18F, by the reference number 846. The phenomenon can be avoided by limiting the pinion face width, or by modifying the pinion tooth curvature and geometry. A similar phenomenon may be present during the face gear teeth generating process as well, as shown in FIG. 18G by reference number 848. This undesirable phenomenon can be avoided also by limiting the face gear teeth inner diameter surface, illustrated by reference number 849, or by modifying the face gear tooth curvature and geometry. Among the value, within practical tolerances, of the center distance 180, for a functional assembly comprising a double involute pinion and a face gear, two other dimensions, indicated in FIG. 18D by the reference numbers 844 and 849 are also important. The dimension 844 is used in controlling the amount of gear teeth clearance and the present invention discloses a double involute pinion-face gear drive system with wider tolerances on aligning the pinion along the face gear axis, due to the normal involute profile of the pinion teeth and the straight-line flanks of the face gear teeth, within pinion pitch plane. The dimension 847 helps in positioning the pinion pitch plane, tangent to the face gear cylinders of radii $r_{bg}$, $(r_{bg}-p)$ or $(r_{bg}+p)$, for gear drives according to the present invention having the teeth longitudinally curved along a normal, extended or shortened involute curve, respectively, and is within the range of liberal tolerances, where p is the degree of involute curve modification required by a specific design.

It should also be understood that a double involute pinion-face gear drive according to the present invention may have the face gear teeth helix angle direction of left-hand (LH) or right-hand (RH), as a result of the direction of development of the face gear teeth longitudinally involute shape curve, an aspect that influences the direction of forces on the corresponding bearings. Referring to FIG. 19A, an exemplary double involute pinion-face gear drive in which the pinion is the drive gear is illustrated and designated by the reference number 910. The double involute pinion-face gear drive system 910 includes a pinion 920 having a plurality of involute teeth 922, longitudinally curved along a normal involute curve and disposed on a first axis 924. The first axis 924, the axis of the pinion 920, is offset a distance 180 from a second, orthogonal axis 926 on and about which a face gear 930 is disposed and rotates. The face gear 930 includes a plurality of teeth 932 longitudinally curved along the same normal involute curve of the face gear 930 base circle which have the helix angle of left-hand direction. The reference numbers 920', 920" and 920''' illustrate possible assembly mesh positions of the double involute pinion 920 on the same LH face gear 930 at the same prescribed center distance 180. Referring to FIG. 19B, an exemplary double involute pinion-face gear drive in which the pinion is the drive gear is illustrated by the reference number 940. The double involute pinion-face gear drive system 940 includes a pinion 950 having a plurality of involute teeth 952, longitudinally curved along a normal involute curve and disposed on a first axis 954. The first axis 954, the axis of the pinion 950, is offset a distance 180 from a second, orthogonal axis 956 on and about which a face gear 960 is disposed and rotates. The face gear 960 includes a plurality of teeth 962 longitudinally curved, along the same normal involute curve of the face gear 960 base circle, which have the helix angle of right-hand direction. The reference numbers 950', 950" and 950''' illustrate couple of possible assembly mesh positions of the double involute pinion 950 on the same RH face gear 960 at the same prescribed center distance 180.

As typical in the family of orthogonal skew-axis gearing known as "worm-face gear drives", it should be understood that for a double involute pinion-face gear drive system according to the present invention it is also possible to achieve different gear speed ratios using the same face gear drive. Referring to FIG. 20, a first exemplary LH double involute pinion-face gear drive in which the pinion is the drive gear is illustrated and designated by the reference number 970. The first double involute pinion-face gear drive system 970 includes a pinion 975 having a plurality of involute teeth 972, longitudinally curved along a normal involute and disposed on a first axis 974. By way of example and illustration only, the pinion 975 includes six involute teeth 972. The first axis 974, the axis of the pinion 975 is offset a distance 180 from a second, orthogonal axis 976 on and about which a face gear 985 is disposed and rotates. The face gear 985 includes a plurality of teeth 982 longitudinally curved along the same normal involute curve of the face gear base circle 973. By way of example and illustration only, the face gear 985 includes forty-five involute teeth 982. As noted above, the pinion 975 is the input or drive gear, and according to relation (15), the ratio of input speed to output speed is 45/6 or 7.5. The gear drive reduction ratio will be 6/45 or 0.133. A second double involute pinion-face gear drive system 990 includes a pinion 995 having a plurality of involute teeth 992, longitudinally curved along a normal involute curve and disposed on a first axis 994. By way of example and illustration only, the pinion 995 includes nineteen involute teeth 992. The first axis 994, the axis of the pinion 995 is offset a distance 180 from a second, orthogonal axis 976 on and about which a face gear 985 is disposed and rotates. The face gear 985 includes a plurality of teeth 982 longitudinally curved along the same normal involute curve of the face gear base circle 973. By way of example and illustration only, the face gear 985 includes forty-five involute teeth 982. As noted above, the pinion 995 is the input or drive gear, and according to relation (15), the ratio of input speed to output speed is 45/19 or 2.368. The gear drive reduction ratio will be 19/45 or 0.422. Thus the same face gear drive 985 can mesh two different pinions 975 and 995, which have different number of teeth but the same pitch (module) given by relation (17). This feature is often known as the gear drive interchangeability capability. Obviously, there are many other gear speed ratios possible, but their number is limited. The alternative possible arrangement locations of the double involute pinion relative to the face gear drive can be considered not only in incremental multiple angles of 90°, as shown in FIG. 20 by the reference number 998, but also in incremental multiple angles different of 90°, as illustrated by the reference number 999.

The description of the invention is merely exemplary in nature and variations that do not depart from the gist of the invention are intended to be within the scope of the invention. Such variations are not to be regarded as a departure from the spirit and scope of the invention.

What is claimed is:

1. A double involute pinion-face gear drive comprising, in combination,
   a double involute pinion disposed on a first axis and having a cylindrical periphery, said double involute pinion having a plurality of normal involute teeth disposed radially on said cylindrical periphery and shaped along an involute curve in a lengthwise direction of said normal involute teeth, of one of left-hand and right-hand helix angle and
   a face gear disposed on a second axis and having a pair of side faces, said face gear disposed orthogonal to and spaced from said first axis at a predetermined center distance, said face gear in mesh with said double involute pinion and having a plurality of teeth disposed on one of said side faces and shaped along an involute curve in a lengthwise direction of said teeth, of one of left-hand and right-hand helix angle;
   said double involute pinion having its pitch plane perpendicular to said first axis, containing a double involute pinion pitch circle and the pitch point as the common point of instantaneous contact between the pinion and face gear teeth surfaces;
   said face gear having its pitch plane perpendicular to said second axis, containing the face gear base circle from which said plurality of teeth of said face gear are generated and the pitch point as the common point of instantaneous contact between the pinion and face gear teeth surfaces;
   said double involute pinion pitch plane being in a predetermined arrangement relative to said face gear base circle,
   wherein said double involute pinion is integrally formed with a shank and said shank is aligned with said first axis.

2. The double involute pinion-face gear drive of claim 1 wherein said double involute pinion teeth and said face gear teeth are longitudinally shaped in a form of a shortened involute curve of said face gear base circle, while said double involute pinion pitch plane is arranged tangential to a circle outwardly concentric to said face gear base circle at a prescribed grade of involute modification.

3. The double involute pinion-face gear drive of claim 1 wherein said double involute pinion teeth and said face gear teeth are longitudinally shaped in a form of a normal involute curve of said face gear base circle, while said double involute pinion pitch plane is arranged tangential to said face gear base circle.

4. The double involute pinion-face gear drive of claim 1 wherein said double involute pinion teeth and said face gear teeth are longitudinally shaped in a form of an extended involute curve of said face gear base circle, while said double involute pinion pitch plane is arranged tangential to a inwardly concentric to said face gear base circle at a prescribed grade of involute modification.

5. The double involute pinion-face gear drive of claim 1 wherein said plurality of teeth on said double involute pinion equals said plurality of teeth on said face gear.

6. The double involute pinion-face gear drive of claim 1 wherein said plurality of teeth on said double involute pinion have both convex flanks as normal involute profiles of equal pressure angles within said double involute pinion pitch plane, while said plurality of teeth on said face gear have both convex and concave flanks as straight-lined rack shape profiles of also equal pressure angle within said double involute pinion pitch plane.

7. The double involute pinion-face gear drive of claim 1 wherein said plurality of teeth on said double involute pinion have both convex flanks as normal involute profiles of different pressure angles within said double involute pinion pitch plane, while said plurality of teeth on said face gear have both convex and concave flanks as straight-lined rack shape profiles of also different pressure angle within said double involute pinion pitch plane.

8. The double involute pinion-face gear drive of claim 1 wherein said double involute pinion drives said face gear.

9. The double involute pinion-face gear drive of claim 1 wherein said face gear drives said double involute pinion.

10. The double involute pinion-face gear drive of claim 1 wherein said double involute pinion is interchangeable in order to obtain different gear speed ratios for the same offset arrangement at a prescribed center distance of multiple said double involute pinions having the same modulus but different number of teeth.

11. The double involute pinion-face gear drive of claim 1 wherein said plurality of teeth on said face gear have a medium helix angle within the range from 30° to 45°.

12. The double involute pinion-face gear drive of claim 1 capable of providing a wide range of relative low speed gear ratios, including gear speed ratios as low as 1:1 and as high as 7.5:1.

13. The double involute pinion-face gear drive of claim 1 wherein said face gear defines an aperture aligned with said second axis and is received upon and secured to a second shaft.

14. The double involute pinion-face gear drive of claim 1 wherein said face gear defines an aperture aligned with said second axis and is received upon and secured directly to a second shaft or a rotatable flange.

15. The double involute pinion-face gear drive of claim 1 wherein said plurality of said double involute pinion teeth and plurality of said face gear teeth are made from one of metal by a cutting process, plastic by an injection molding process and powdered metal by a metal sintering process.

16. A double involute pinion-face gear drive system comprising, in combination,
   a double involute pinion disposed on a first axis, said double involute pinion having a plurality of normal involute teeth, of the same or different pressure angle flanks, disposed radially on its cylindrical periphery and shaped in a lengthwise direction of said teeth along an involute curve, of one of left-hand and right-hand helix angle, and
   a face gear disposed on a second axis orthogonal to and spaced from said first axis at a predetermined center distance, said face gear in mesh with said double involute pinion and having a plurality of teeth, of the same or different pressure angle flanks, disposed on one of its side faces and shaped in lengthwise direction of said teeth along an involute curve, said plurality of teeth on said face gear having a medium helix angle within the range of from 30° to 45°;
   said double involute pinion having its pitch plane perpendicular to its axis, containing said double involute pinion pitch circle and the pitch point as the common point of instantaneous contact between the pinion and face gear teeth surfaces;
   said face gear having its pitch plane perpendicular to its axis, containing the face gear base circle from which the involute teeth of said face gear are generated and the pitch point as the common point of instantaneous contact between the pinion and face gear teeth surfaces;

said double involute pinion pitch plane being in a predetermined arrangement relative to said face gear base circle, wherein said double involute pinion is integrally formed with a shank and said shank is aligned with said first axis.

17. The double involute pinion-face gear drive system of claim 16 wherein said double involute pinion and face gear teeth are longitudinally shaped in a form of a normal, shortened, or extended involute curve within said face gear pitch plane, while said double involute pinion pitch plane is arranged tangential to a circle, outwardly concentric to said face gear base circle or inwardly concentric to said face gear base circle at a prescribed grade of involute modification, correspondingly.

18. The double involute pinion-face gear drive system of claim 17 wherein said plurality of teeth on said double involute pinion, equals or not, said plurality of teeth on said face gear, thus providing a wide range of relative low speed gear ratios, including gear speed ratios as low as 1:1 and as high as 7.5:1;

said double involute pinion or said face gear being the drive member;

said double involute pinions having the same modulus but different number of teeth are interchangeable for the same offset arrangement at a prescribed center distance;

said plurality of said double involute pinion teeth and a plurality of said face gear teeth are made from: metal by a cutting process, plastic material by an injection molding process or powder metal by a sintering process.

19. A double involute pinion-face gear drive system comprising, in combination, an involute pinion disposed on a first axis and having a cylindrical periphery, said double involute pinion having a plurality of involute teeth shaped along an extended or shortened involute curve in a lengthwise direction of said involute teeth of one of left-hand and right-hand helix angle and an involute face gear disposed on a second axis and having a pair of side faces, said face gear disposed orthogonal to and spaced from said first axis at a predetermined center distance, said involute face gear in mesh with said involute pinion gear and having a plurality of involute teeth disposed on one of said side faces and shaped along an extended or shortened involute curve in a lengthwise direction of said involute teeth of one of left-hand and right-hand helix angle;

said double involute pinion having its pitch plane perpendicular to said first axis, containing a double involute pinion pitch circle and the pitch point as the common point of instantaneous contact between the pinion and face gear teeth;

said face gear having its pitch plane perpendicular to said second axis, containing the face gear base circle from which said plurality of teeth of said face gear are generated and the pitch point as the common point of instantaneous contact between the pinion and face gear teeth;

said double involute pinion pitch plane being in a predetermined arrangement relative to said face gear base circle.

20. The double involute pinion-face gear drive system of claim 19 wherein said plurality of involute teeth disposed on one of said side faces of said face gear have a medium helix angle within the range of from 30° to 45°.

* * * * *